United States Patent
Miniaci

(10) Patent No.: US 7,158,207 B2
(45) Date of Patent: Jan. 2, 2007

(54) FILM PROJECTOR WITH HIGH EFFICIENCY ILLUMINATION

(76) Inventor: Robert R Miniaci, 38 Montague Drive, Kirkland, Quebec (CA) H9J 2M3

( * ) Notice: Subject to any disclaimer, the term of this patent is extended or adjusted under 35 U.S.C. 154(b) by 0 days.

(21) Appl. No.: 10/789,772

(22) Filed: Feb. 27, 2004

(65) Prior Publication Data

US 2004/0239879 A1   Dec. 2, 2004

Related U.S. Application Data

(60) Provisional application No. 60/450,757, filed on Feb. 28, 2003.

(51) Int. Cl.
  *G03B 21/00* (2006.01)
(52) U.S. Cl. ................... 352/203; 352/198
(58) Field of Classification Search ............ 352/45, 352/143, 148, 198, 203; 359/885; 362/347, 362/350

See application file for complete search history.

(56) References Cited

U.S. PATENT DOCUMENTS

| | | | | |
|---|---|---|---|---|
| 3,296,923 A | * | 1/1967 | Miles | 353/38 |
| 3,700,881 A | * | 10/1972 | Slomski | 362/265 |
| 3,798,441 A | * | 3/1974 | Wilson | 362/261 |
| 3,843,879 A | * | 10/1974 | Eddy | 362/218 |
| 4,384,319 A | * | 5/1983 | Blaisdell et al. | 362/296 |
| 4,778,093 A | * | 10/1988 | Renold | 226/113 |
| 5,059,146 A | * | 10/1991 | Thomas et al. | 445/4 |
| 5,144,190 A | * | 9/1992 | Thomas et al. | 313/113 |
| 6,048,080 A | * | 4/2000 | Belliveau | 362/282 |
| 6,172,734 B1 | * | 1/2001 | Wright | 352/208 |
| 6,736,527 B1 | * | 5/2004 | Gibbon et al. | 362/264 |

* cited by examiner

*Primary Examiner*—Rodney Fuller
(74) *Attorney, Agent, or Firm*—Harrington & Smith, LLP

(57) ABSTRACT

A motion picture film projector including a lamp house section having a lamp bulb and a reflector; a head section located in front of the lamp house section; and an optical member located proximate a junction between the lamp house section and the head section. The optical member has infrared filtering coatings on both a front side and a rear side of the optical member. The reflector has a rear aperture with a portion of the lamp bulb extending therethrough. The rear aperture is larger than a center outer diameter of the lamp bulb. The lamp bulb and the reflector are sized and shaped such that an operator looking rearward from a front side of the lamp bulb and reflector can see a general ring shaped gap between the reflector and the lamp bulb when the lamp bulb is aligned relative to the reflector.

17 Claims, 26 Drawing Sheets

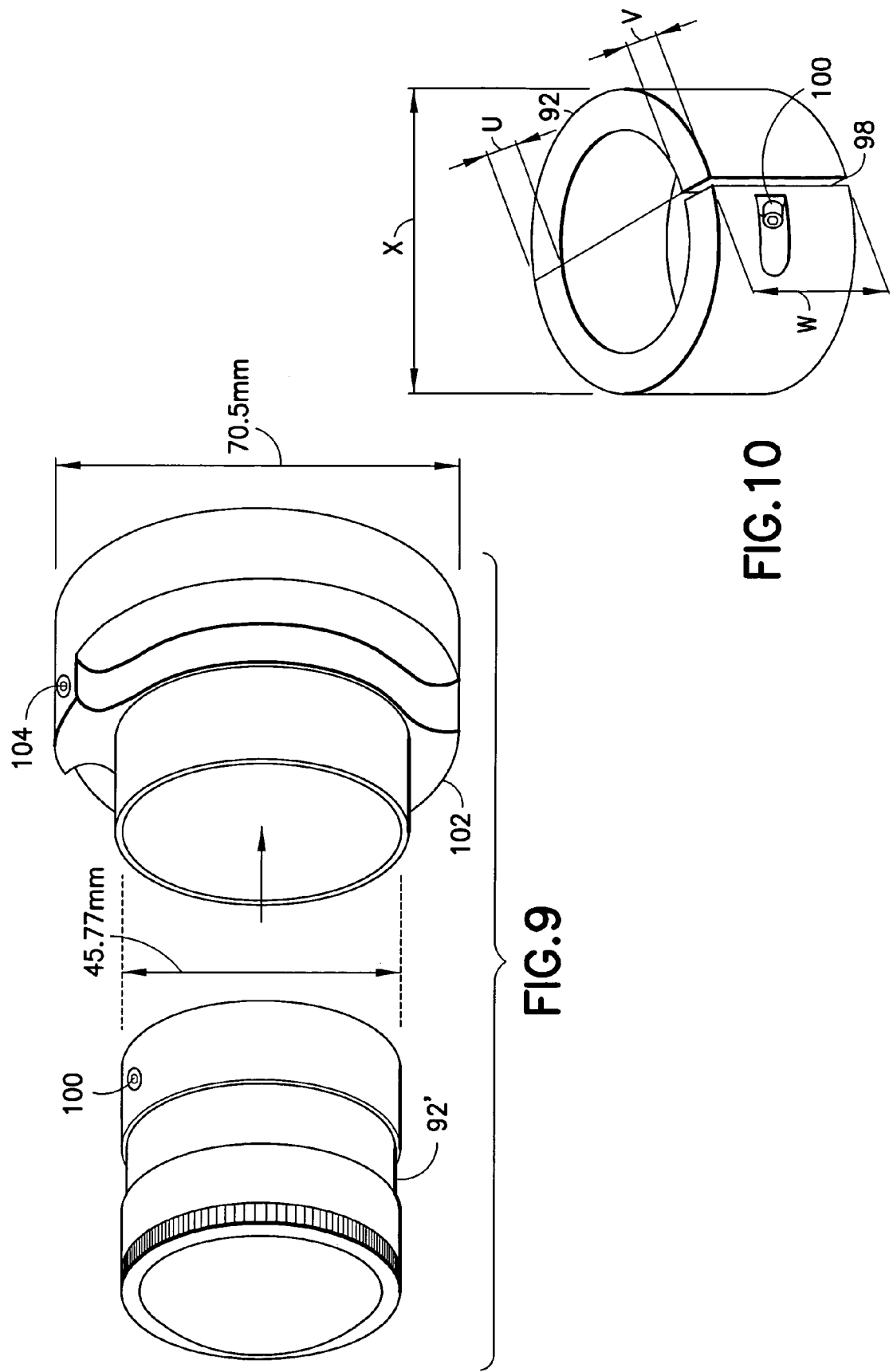

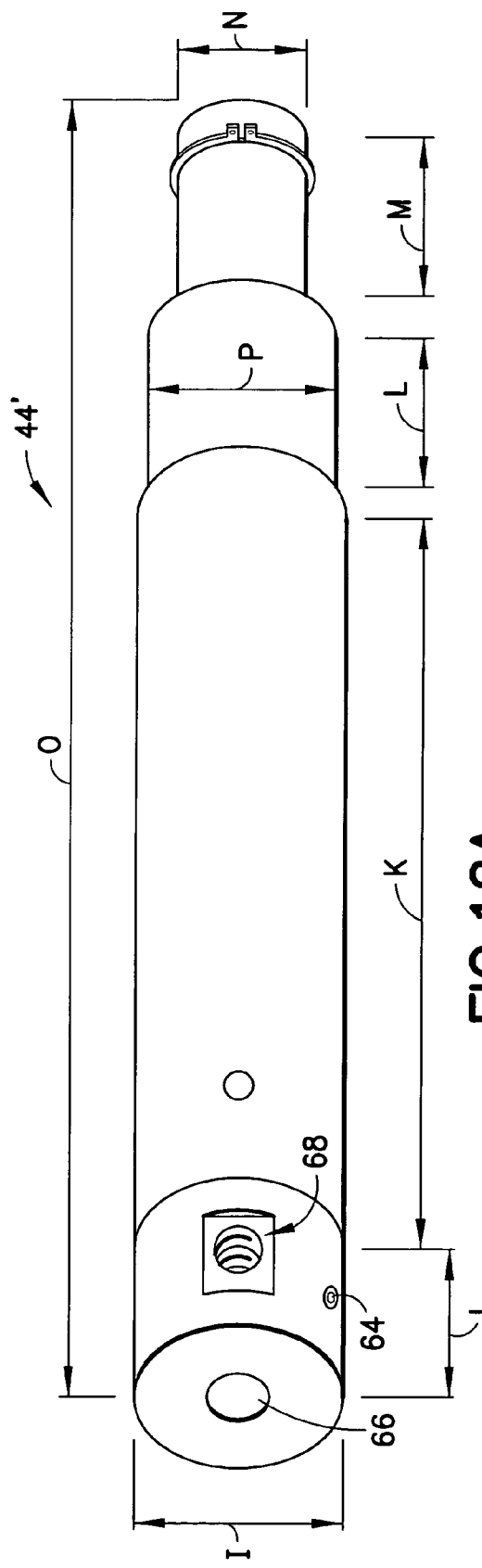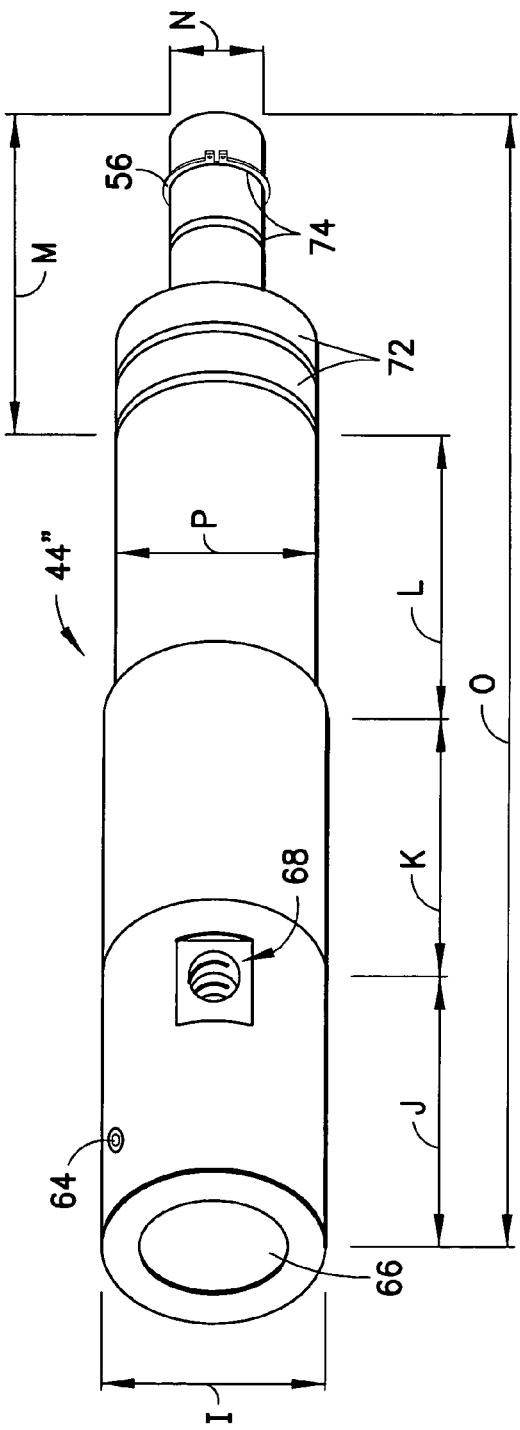
FIG.12A
FIG.12B

SCREEN LUMINANCE READINGS
(by zone, in foot-Lamberts)

| 11.0 | 12.4 | 12.8 | 12.8 | 12.6 | 12.2 | 12.2 | 11.8 | 11.4 |
|------|------|------|------|------|------|------|------|------|
| 12.4 | 13.8 | 14.4 | 14.4 | 14.4 | 14.2 | 13.8 | 13.4 | 12.6 |
| 11.0 | 12.4 | 12.8 | 13.0 | 13.0 | 12.8 | 12.4 | 12.2 | 11.4 |
| 9.4  | 10.4 | 10.8 | 10.8 | 10.8 | 10.8 | 10.6 | 10.4 | 10.2 |
| 8.8  | 9.4  | 9.8  | 10.0 | 10.0 | 10.0 | 10.0 | 9.8  | 9.2  |

FIG.25

SCREEN LUMINANCE READINGS
(by zone, in foot-Lamberts)

| 10.4 | 12.2 | 13.8 | 14.8 | 15.2 | 15.0 | 14.6 | 13.6 | 12.0 |
|------|------|------|------|------|------|------|------|------|
| 13.8 | 16.4 | 18.6 | 19.8 | 20.5 | 20.0 | 19.4 | 17.8 | 15.2 |
| 13.8 | 16.4 | 18.0 | 19.2 | 19.6 | 19.2 | 18.4 | 17.0 | 14.6 |
| 12.4 | 14.4 | 15.8 | 16.6 | 17.0 | 16.8 | 16.0 | 14.6 | 12.6 |
| 10.6 | 12.8 | 14.0 | 14.8 | 15.2 | 14.8 | 13.8 | 12.6 | 10.0 |

FIG.26

SCREEN LUMINANCE READINGS
*(by zone, in foot-Lamberts)*

| 6.6 | 8.8 | 10.0 | 11.4 | 11.8 | 11.8 | 10.8 | 9.6 | 7.4 |
|---|---|---|---|---|---|---|---|---|
| 6.8 | 8.8 | 10.4 | 11.6 | 12.6 | 12.2 | 11.4 | 9.8 | 8.0 |
| 7.0 | 8.4 | 10.0 | 11.0 | 11.8 | 11.4 | 10.6 | 9.4 | 8.2 |
| 7.2 | 8.4 | 10.0 | 10.8 | 11.2 | 11.2 | 10.8 | 9.4 | 8.2 |
| 7.2 | 9.0 | 10.6 | 12.0 | 12.6 | 12.6 | 12.0 | 10.0 | 8.2 |

FIG.27

SCREEN LUMINANCE READINGS
*(by zone, in foot-Lamberts)*

| 8.8 | 12.2 | 15.2 | 17.0 | 17.0 | 15.8 | 14.0 | 11.4 | 8.2 |
|---|---|---|---|---|---|---|---|---|
| 10.8 | 15.2 | 18.8 | 20.5 | 20.5 | 19.4 | 17.0 | 13.8 | 9.6 |
| 10.8 | 14.8 | 17.4 | 19.2 | 19.6 | 18.0 | 15.6 | 13.0 | 9.0 |
| 9.8 | 13.2 | 15.4 | 16.6 | 16.6 | 15.6 | 13.6 | 10.8 | 7.8 |
| 9.0 | 12.2 | 14.4 | 15.4 | 15.6 | 14.6 | 12.6 | 10.2 | 6.8 |

FIG.28

SCREEN LUMINANCE READINGS
*(by zone, in foot-Lamberts)*

| 14.4 | 14.0 | 13.8 | 14.0 | 14.2 | 14.2 | 14.4 | 15.0 | 15.4 |
|------|------|------|------|------|------|------|------|------|
| 17.2 | 17.2 | 17.4 | 17.4 | 17.6 | 17.4 | 17.8 | 18.0 | 17.4 |
| 16.4 | 16.6 | 16.6 | 17.2 | 17.2 | 16.8 | 16.6 | 16.8 | 16.0 |
| 15.0 | 15.2 | 15.4 | 15.8 | 15.4 | 15.4 | 15.4 | 15.2 | 14.8 |
| 14.8 | 15.2 | 15.2 | 15.6 | 15.4 | 15.2 | 15.2 | 15.2 | 14.4 |

FIG.29

SCREEN LUMINANCE READINGS
*(by zone, in foot-Lamberts)*

| 13.4 | 14.4 | 15.6 | 16.8 | 16.8 | 16.8 | 15.8 | 15.2 | 14.4 |
|------|------|------|------|------|------|------|------|------|
| 17.2 | 19.8 | 21.0 | 22.0 | 22.5 | 22.0 | 21.0 | 20.0 | 18.2 |
| 17.4 | 19.6 | 20.5 | 22.5 | 22.0 | 21.5 | 20.5 | 19.6 | 17.6 |
| 16.0 | 17.6 | 18.8 | 19.4 | 19.2 | 19.0 | 18.4 | 17.0 | 15.4 |
| 13.6 | 15.6 | 16.8 | 17.8 | 17.4 | 17.4 | 16.4 | 15.2 | 13.6 |

FIG.30

SCREEN LUMINANCE READINGS
*(by zone, in foot-Lamberts)*

| 14.8 | 14.6 | 14.8 | 14.8 | 14.8 | 14.8 | 15.0 | 15.2 | 15.0 |
| --- | --- | --- | --- | --- | --- | --- | --- | --- |
| 16.6 | 17.4 | 17.8 | 17.8 | 18.0 | 17.8 | 18.0 | 17.8 | 16.4 |
| 15.6 | 16.6 | 16.8 | 17.4 | 17.4 | 17.2 | 16.8 | 16.6 | 15.2 |
| 14.6 | 15.2 | 15.8 | 16.0 | 15.8 | 15.8 | 15.6 | 15.2 | 14.4 |
| 14.4 | 15.4 | 15.8 | 16.4 | 16.4 | 16.2 | 16.0 | 15.4 | 14.2 |

FIG.31

SCREEN LUMINANCE READINGS
*(by zone, in foot-Lamberts)*

| 11.0 | 13.4 | 15.2 | 16.4 | 16.6 | 16.2 | 15.2 | 13.8 | 12.2 |
| --- | --- | --- | --- | --- | --- | --- | --- | --- |
| 13.2 | 16.8 | 18.8 | 20.0 | 20.5 | 19.8 | 18.8 | 17.2 | 14.6 |
| 13.0 | 16.4 | 18.0 | 19.8 | 19.8 | 19.2 | 17.6 | 16.4 | 14.0 |
| 12.4 | 15.2 | 16.6 | 17.6 | 17.6 | 17.0 | 16.2 | 14.8 | 12.8 |
| 11.8 | 14.6 | 16.2 | 17.4 | 17.2 | 17.0 | 16.2 | 14.6 | 12.4 |

FIG.32

FILM PROJECTOR WITH HIGH EFFICIENCY ILLUMINATION

CROSS REFERENCE TO RELATED APPLICATION

This application claims the, benefit under 35 U.S.C. § 119(e) of provisional patent application No. 60/450,757 filed Feb. 28, 2003 which is hereby incorporated by reference in its entirety.

BACKGROUND OF THE INVENTION

1. Field of the Invention

The present invention relates to film projectors and, more particularly, to a system for producing a better picture from a film projector and faster bulb alignment maintenance adjustments, and a system for retrofitting a conventional film projector to produce a better picture and faster adjustments.

2. Brief Description of Prior Developments

Generally speaking, the state of the art motion picture film projector is little changed from those produced in the 1950's, when the advent of robust color films and Xenon arc lamps encouraged the manufacturer's to make design changes. The most basic mechanisms within film projectors, such as the intermittent drive, the shutter, and the projection lens, can be seen in the earliest patents; such as U.S. Pat. No. 93,594. Although at present, some manufacturers are producing re-designed projectors with modularity, stepper and servo motor drives, and modern control circuitry, the basic system design is still relatively unchanged.

Although digital technology has advanced many aspects of image presentation, some prior or older technologies are still wanting of improvements. One example is that of film projectors used in applications such as in movie theaters, for the projection of celluloid based films.

Such film projectors typically include large illumination sources, many of which are rated for 7,000 watts. Aside from consuming a considerable amount of energy, these sources typically produce considerable excess heat. Some of these systems offer further drawbacks in that illumination is uneven across a projection area.

Given the press of competition, the need for efficient or lower cost illumination is desirable for commercial operation of film projectors. Also, as consumers have become accustomed to improved images, improvements in projection quality are desired, but without the costs associated with digital technology.

Therefore, what is needed is an illumination source for a celluloid based motion picture film projector that consumes less energy than typical illumination sources, as well as providing for improved image quality.

SUMMARY OF THE INVENTION

The foregoing and other problems are overcome by methods and apparatus in accordance with embodiments of this invention.

Disclosed herein is an illumination system for use in a film projector. The illumination system may be installed in an existing projector, such as in a retrofit kit, or incorporated into a new projector.

The system includes a Xenon arc-based light source and various reflectors of different material surfaces and parabolic configurations, which maximize the potential of a concentrated light beam on 16, 35 and 70 mm or other embodiments of celluloid based motion picture film.

For screens of 70 feet or more, the system can use a high-speed pull-down with a Simplex X-L projector or Millennium, as well as a 72-degree shutter to obtain the most amount of light capable of passing through a 35 mm aperture at a maximum ratio of 2.35.

The system can incorporate an infra-red (IR) reduction process. Using heat filters of 100, 127 or 139 mm, along with the IR properties of the various reflectors, a heat reduction of up to 70% less than a 7000 watt system can be achieved.

The system achieves greater efficiency through directing light produced by the bulb and parabola in such a way that the light travels through the film's emulsion with the greatest efficiency. The system can be tailored to specific projectors and lamp houses, either as a retro-fit kit or a complete projection system, which accommodates small screens up to screens as large as 150 ft wide or greater.

It is considered that the embodiments provided herein are illustrative only, and are not to be considered limiting of the invention.

In accordance with one aspect of the present invention, a motion picture film projector is provided including a lamp house section having a lamp bulb and a reflector; a head section located in front of the lamp house section; and an optical member located proximate a junction between the lamp house section and the head section. The optical member has infrared filtering coatings on both a front side and a rear side of the optical member.

In accordance with another aspect of the present invention, a motion picture film projector lamp house assembly is provided comprising a lamp bulb aligned generally horizontally; a reflector having a rear aperture with a portion of the lamp bulb extending therethrough. The rear aperture is larger than a center outer diameter of the lamp bulb. The lamp bulb and the reflector are sized and shaped such that an operator looking rearward from a front side of the lamp bulb and reflector, and looking generally coaxially relative to a center longitudinal axis of the lamp bulb, can see a general ring shaped gap between the reflector and the lamp bulb when the lamp bulb is aligned relative to the reflector.

In accordance with another aspect of the present invention, a motion picture film projector retrofit kit is provided comprising a reflector; a reflector mounting system for mounting the reflector to a reflector holder of a lamp house for replacing an old reflector to be replaced; a lamp bulb for replacing an old lamp bulb to be replaced; and a lamp bulb anode adaptor which is sized and shaped to be attached to a lamp bulb anode of the lamp house and adapted to allow a rear end of the lamp bulb to be mounted to the adaptor. The adaptor is adapted to space the rear end of the lamp bulb forward from the lamp bulb anode and thereby allow the lamp bulb to be located closer to a front end of the lamp house than the old lamp bulb being replaced.

In accordance with one method of the present invention, a method for aligning a lamp bulb with a reflector in a motion picture film projector is provided comprising providing the reflector with a rear hole; positioning the lamp bulb to pass through the rear hole of the reflector; visually observing from a front end of the lamp bulb a general ring shaped gap between a center outer diameter of the lamp bulb located in front of the rear hole and an inner perimeter of the reflector at the rear hole; and adjustably moving a front end of the lamp bulb to make the gap substantially uniform and thereby align the lamp bulb with the reflector.

BRIEF DESCRIPTION OF THE DRAWINGS

The foregoing aspects and other features of the present invention are explained in the following description, taken in connection with the accompanying drawings, wherein:

FIGS. 7–13 depict aspects of components used in the illumination system; wherein FIGS. 7–8 represent embodiments of an anode adaptor; FIG. 9 represents an anamorphic eccentric collar adaptor; FIG. 10 represents a 4" eccentric collar; FIG. 11 represents a variable lens; and FIGS. 12–13 represent embodiments of a Teflon anode adaptor;

FIGS. 14–23 represent aspects of components for the retrofit of an existing lamp house; wherein FIGS. 14–15 represent aspects of the reflector bracket for a Big Sky lamp house; FIGS. 16–17 represent aspects of the reflector bracket for a Strong lamp house; FIGS. 18–23 represent aspects of the reflector bracket for a Christie SLC lamp house;

FIGS. 24–32 provide results showing enhanced illumination performance in the illumination system disclosed herein; wherein FIG. 24 provides a comparison of two embodiments of the system disclosed herein is to a conventional 7000 watt console; FIGS. 25–26 provide a comparison between a 7000 watt conventional system and a 4200 watt system of the present invention in a scope format; FIGS. 27–28 provide a comparison between a 7000 watt conventional system and a 4200 watt system of the present invention in a flat format; FIGS. 29–30 provide a comparison between a 7000 watt conventional system and a 4200 watt system of the present invention in a scope format for a second screen; and, FIGS. 31–32 provide a comparison between a 7000 watt conventional system and a 4200 watt system of the present invention in a flat format for a second screen;

DETAILED DESCRIPTION OF THE PREFERRED EMBODIMENTS

Figure 1:
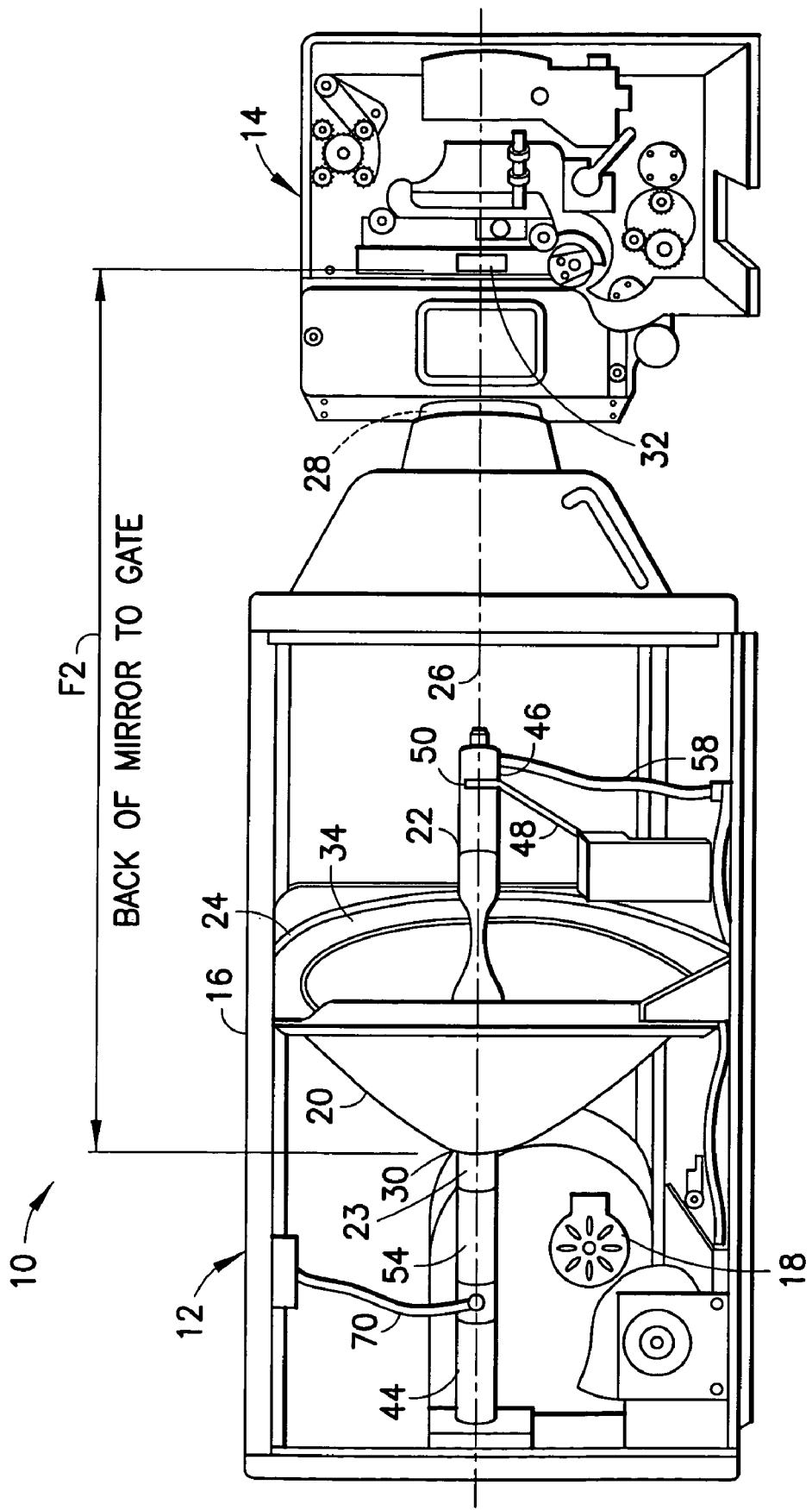
FIG. 1 depicts the illumination system in relation to film projection equipment.

Referring to FIG. 1, there is shown a cut away diagram of components of a film projector 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The film projector 10 generally comprises a lamp house section 12 and a head section 14. The lamp house section 12 generally comprises a frame 16, a cooling fan 18, a reflector or mirror 20, and a lamp bulb 22. The reflector 20 is stationarily mounted to a holder section 24 of the frame 16. In a preferred embodiment, the attachment of the reflector to the holder section 24 is adapted to allow the reflector 20 to expand and contract based upon thermal heat variants. The reflector 20 and lamp bulb 22 are adapted to generate light along a center axis 26. The cooling fan 18 is connected to the frame 16 and is adapted to remove the heated air from inside the lamp house section 12.

Figure 2:
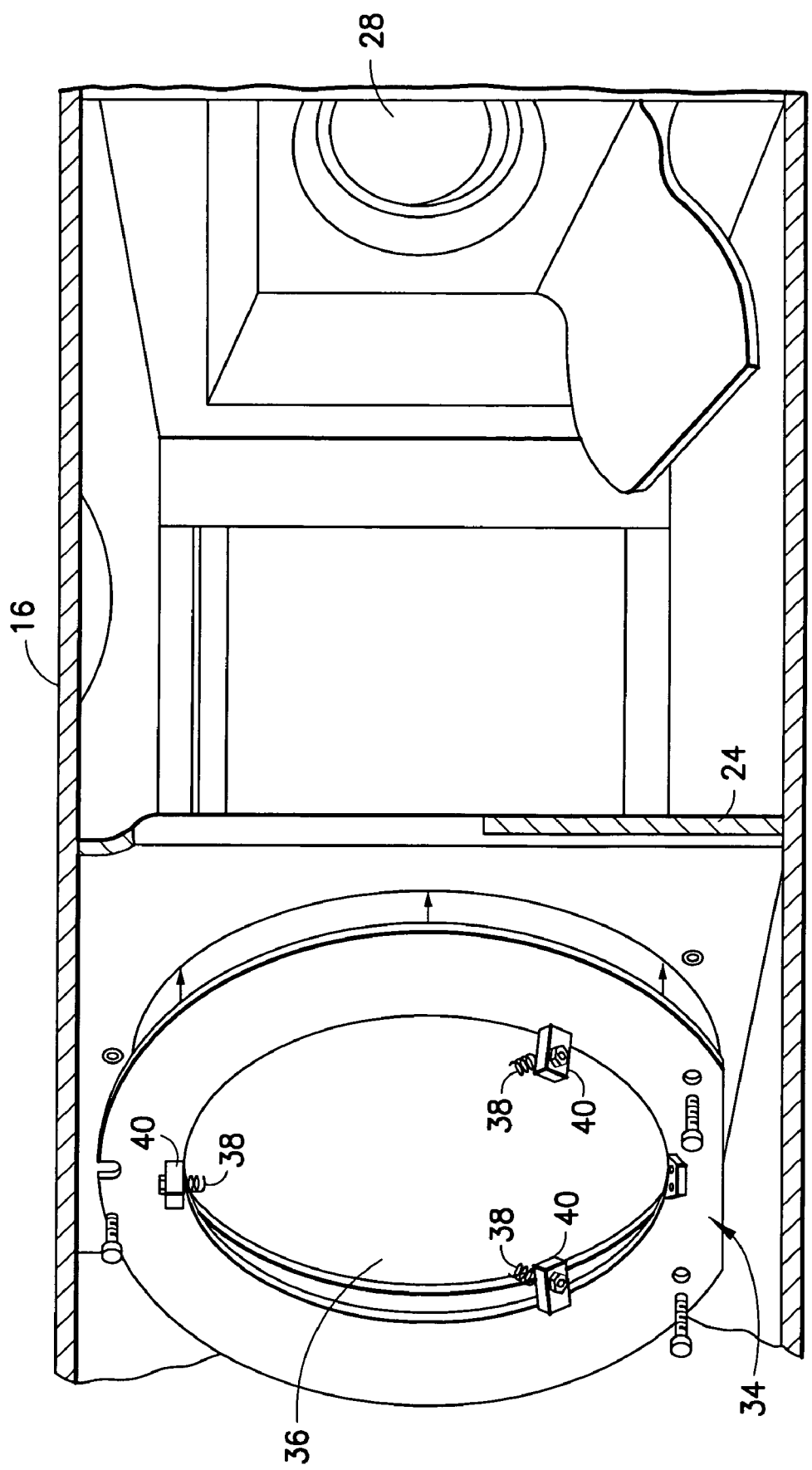
FIG. 2 depicts components used in the retrofit of an existing lamp house.

Referring also to FIG. 2, the lamp house section 12 also comprises an optical member 28. The optical member 28 is attached to the front end of the frame 16 at a junction between the lamp house section 12 and the head section 14. The optical member 28 comprises an infrared filter. More specifically, the optical member 28 comprises a filter having infrared filtering coatings on both a front side and a rear side of the filter 28. In the past, only a one sided coating was provided. Two sided coatings were not provided in the past because too much light was lost. However, new coatings are now available which allow both sides of the filter to be coated with only about a 20 percent loss of light. The benefits of moving the lamp bulb and reflector closer to the front of the lamp house far exceed a 20 percent loss from use of a two-side coated IR filter. With old conventional systems the loss at the optical member was about 3–5 foot-lamberts (fL). With the use of the present invention, the loss is only about 0.5–1.2 foot-lamberts (fL). Because this loss is magnified by the lens and distances from projection in the head section, the present invention provides a significantly brighter image on the motion picture screen.

The filter 28 is adapted to limit infrared heat radiation from the lamp house section 12 to the head section 14 while maintained about 80 percent of the visual light from the lamp house section 12 to the head section 14. Because the filter 28 has infrared filtering coatings on both its front side and rear side, this allows the lamp bulb 22 to be located closer to the front of the lamp house section frame 16 than previously allowed. In the past, the lamp bulb 22 was located further away from the front of the lamp house section because of risk of heat damage to the film passing through the head section 14. Thus, the filter 28 allows the lamp bulb 22 to be located closer to the head section 14 without substantially increasing risk of heat damage to the film traveling through the head section.

As seen in FIG. 1, the distance F2 between the back 30 of the reflector 20 and the gate 32 in the head section 14 is smaller than provided in conventional motion picture film projectors. In the embodiment shown, the distance F2 is about 765 mm. In alternate embodiments, the distance F2 could be more or less than 765 mm. In this embodiment, as seen best in FIG. 2, the projector comprises a retrofit reflector bracket 34. The bracket 34 is attached to the holder section 24 and is adapted to attach the reflector 20 to the holder section 24. The bracket 34, in this embodiment, comprises a rear lip 36 and springs 38 on projections 40. The springs 38 are adapted to bias the front outer perimeter of the reflector 20 against the rear lip 36 of the bracket 34. This mounts the reflector 20 to the holder section 24.

The reflector is preferably comprised of glass, but may be made of metal. A 280 mm diameter front end is at the high end of all conventional lamp houses. The reflector 20 has a shorter length than a conventional reflector for the same size lamp house configuration. Thus, the inside curve is different than a conventional reflector for the same size lamp house configuration. The coating on the inside of the reflector preferably comprises a computerized evaporation coating.

Figure 3:
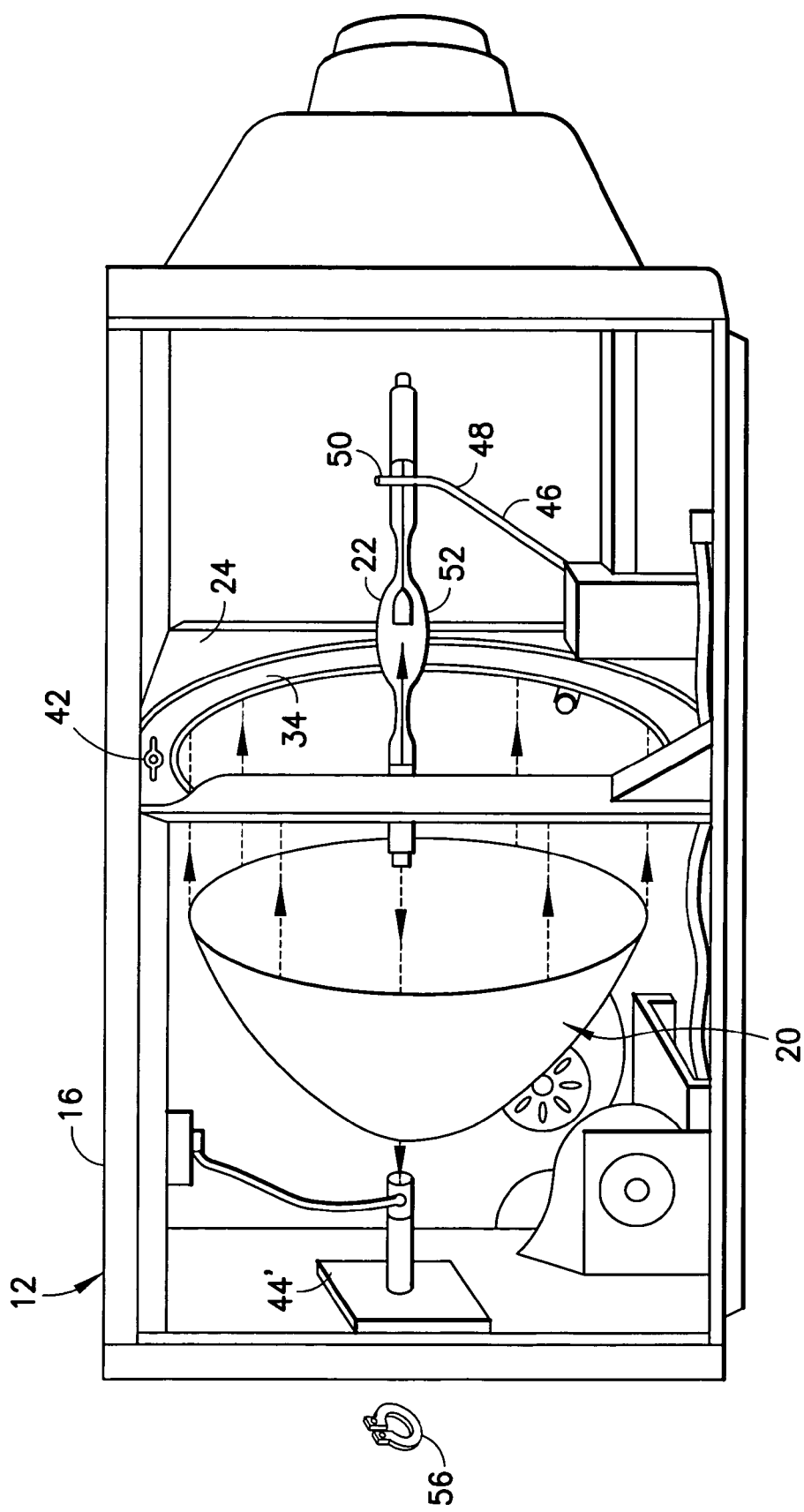
FIG. 3 depicts aspects of the illumination system in a retrofit installation.

Referring also to FIG. 3, the projections 40 can be tightened against the bracket 34 by wing nuts 42 at the front of the bracket 34. In the embodiment shown, the front end of the reflector 20 has a diameter of about 280 mm. The holder section 24 was originally designed to have a larger metal reflector attached to it. The larger metal reflector has been removed and the bracket 34 has been provided to attach in the same manner that the old metal reflector would have been attached to the holder section 24, and accommodate attachment of the smaller reflector 20 (having a smaller diameter front end) to the holder section 24 (and also accommodate heat expansion and contraction of the reflector 20 if made from glass). In alternate embodiments, the front end of the reflector could have any suitable size diameter, and the bracket 34 could be sized and shaped to accommodate that size diameter.

As seen in FIGS. 1 and 3, the lamp house section 12 also comprises an anode 44 and a cathode 46. The anode 44 is attached to a rear side of the frame 16. The cathode 46 is located at a front end of the frame 16 and comprises a cantilevered arm 48. The cantilevered arm 48 projects upward and forward. The cantilevered arm 48 is preferably comprised of metal and is adapted to be deformed, such as moving its distal end 50 vertically up and down and horizontally right and left. In an alternate embodiment, the cantilevered arm 48 could merely comprise an adjustable support for the front end of the bulb 22, and the cathode could comprise a plug attached to the electrical wire 58 which is plugged onto the positive front end of the bulb.

The lamp bulb 22 is mounted between the anode 44 and the cathode 46 in a general horizontal orientation. The center 52 of the lamp bulb 22 has the largest outer diameter of the bulb. In the embodiment shown, the lamp bulb 22 comprises a 4200 Watt bulb. However, in alternate embodiments, any suitable wattage size bulb could be provided. The lamp bulb 22 is designed to replace a larger 7000 Watt bulb with the use of the present invention. The negative end 23 of the bulb 22 fits into an adaptor 54 (see FIG. 1). The adaptor 54 is attached to a front end of the anode 44. More specifically, the adaptor 54 comprises a rear end which is located inside the bulb terminal receiving area of the anode 44. The adaptor 54 comprises a front end which has a receiving area that is adapted to receive the negative end terminal of the bulb 22.

In a preferred embodiment, the negative end of the bulb fits into the front end of the adaptor and is secured with a hex screw. However, in alternate embodiments, any suitable mounting of the end of the bulb to the adaptor could be provided. The adaptor 54 is adapted to function as an electrical conductor between the negative end terminal of the bulb and the anode 44. The adaptor 54 is adapted to longitudinally space the lamp bulb 22 in a forward position in front of the anode 44. Thus, the adaptor 54 functions as a spacer to move the lamp bulb 22 closer to the front end of the lamp house. The length of the adaptor 54 can have any suitable length based upon the length of the bulb 22 and the desired position of the bulb inside the lamp house section.

FIG. 3 comprises an alternate embodiment to the anode/adaptor 44/54 configuration shown in FIG. 1. In FIG. 3, the conventional anode 44 has been replaced with an extended length anode 44'. The extended length anode 44' has the same length as the anode/adaptor 44/54 configuration shown in FIG. 1, but can be provided as a unitary member to replace an existing anode 44 rather than adding an adaptor 54 to the existing anode. In a preferred embodiment, the extended length anode 44' is secured to the back of the frame 16 by a C clip 56. However, in alternate embodiments, any suitable mounting of the extended length anode to the frame of the lamp house section could be provided. In a preferred embodiment, the extended length anode as a length of about 190.5 mm. However, in alternate embodiments, any suitable type of distance could be provided.

Figure 5:
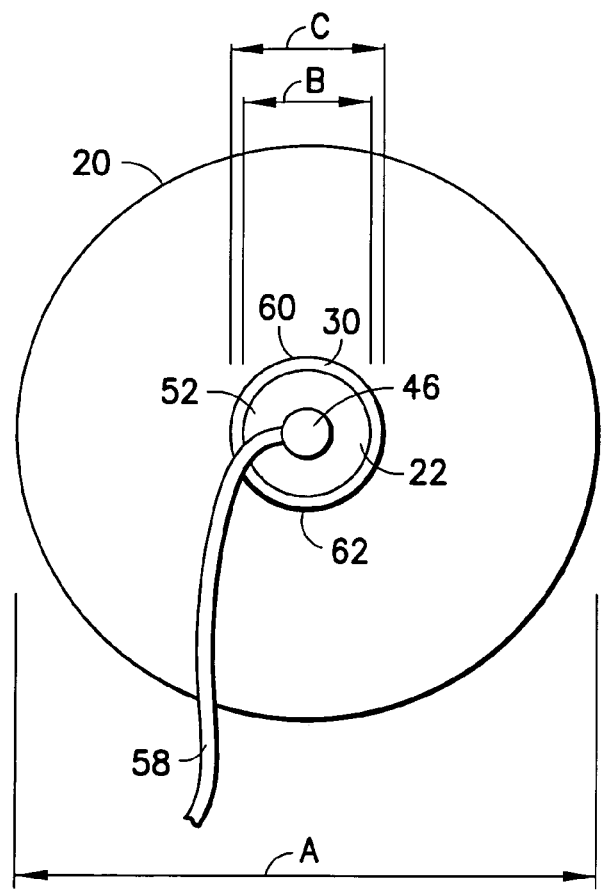
FIG. 5 depicts aspects of one embodiment of the bulb and reflector used in the illumination system.
Figure 6:
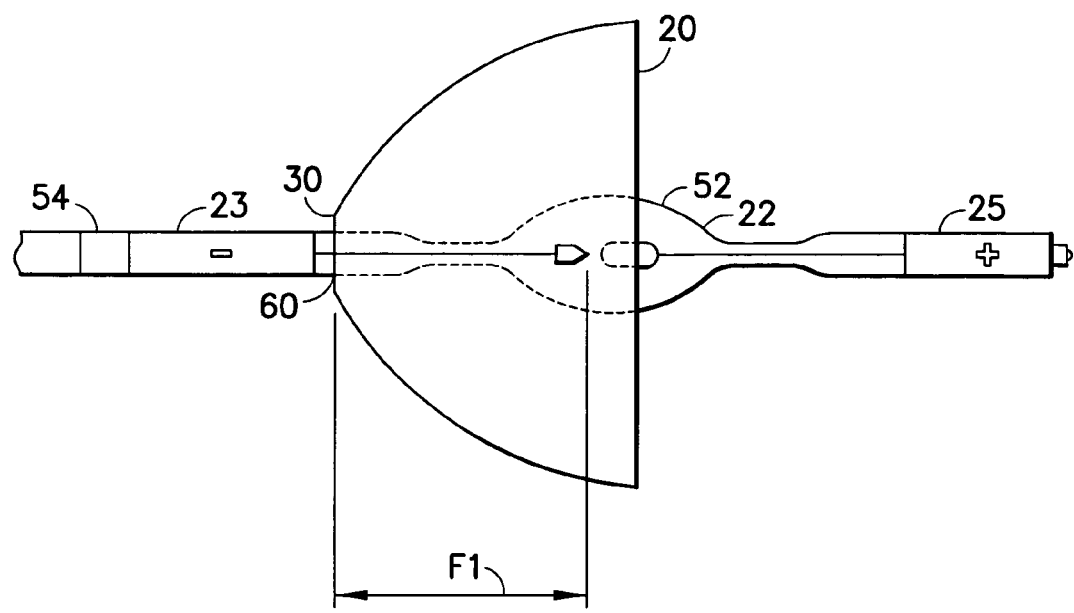
FIG. 6 depicts aspects of the relationship between the bulb and the reflector for one embodiment.

Referring also to FIGS. 5 and 6, the bulb 22 is shown in its position relative to the reflector 20 when the bulb and reflector are properly mounted inside the lamp house section 12. The reflector 20 has a front outer diameter A. In the embodiment shown, the diameter A is about 280 mm. However, as noted above, the diameter A could have any suitable size. The widest section of the bulb 22 at the center 52 has an outer diameter B. The center of the reflector 20, at the back 30 of the reflector, has an aperture or hole 60 therethrough. The hole 60 provides a passageway for the bulb 22 to extend through the reflector 20 and into connection with the adaptor 54. The hole 60 has a diameter C. The diameter C is larger than the largest outer diameter B of the bulb 22. In one embodiment, the diameter B is about 60 mm and the diameter C is about 70 mm. However, in alternate embodiments, any suitable sizes of diameters can be provided, but the diameter of the hole 60 is preferably larger than the diameter of the largest section 52 of the bulb. In the embodiment shown, a distance F1 is provided between the back of the reflector and the tip of the negative end of the conductor of the lamp bulb 22. In a preferred embodiment, the distance F1 is about 55 mm. However, in alternate embodiments, the distance F1 could comprise any suitable distance.

Figure 33:
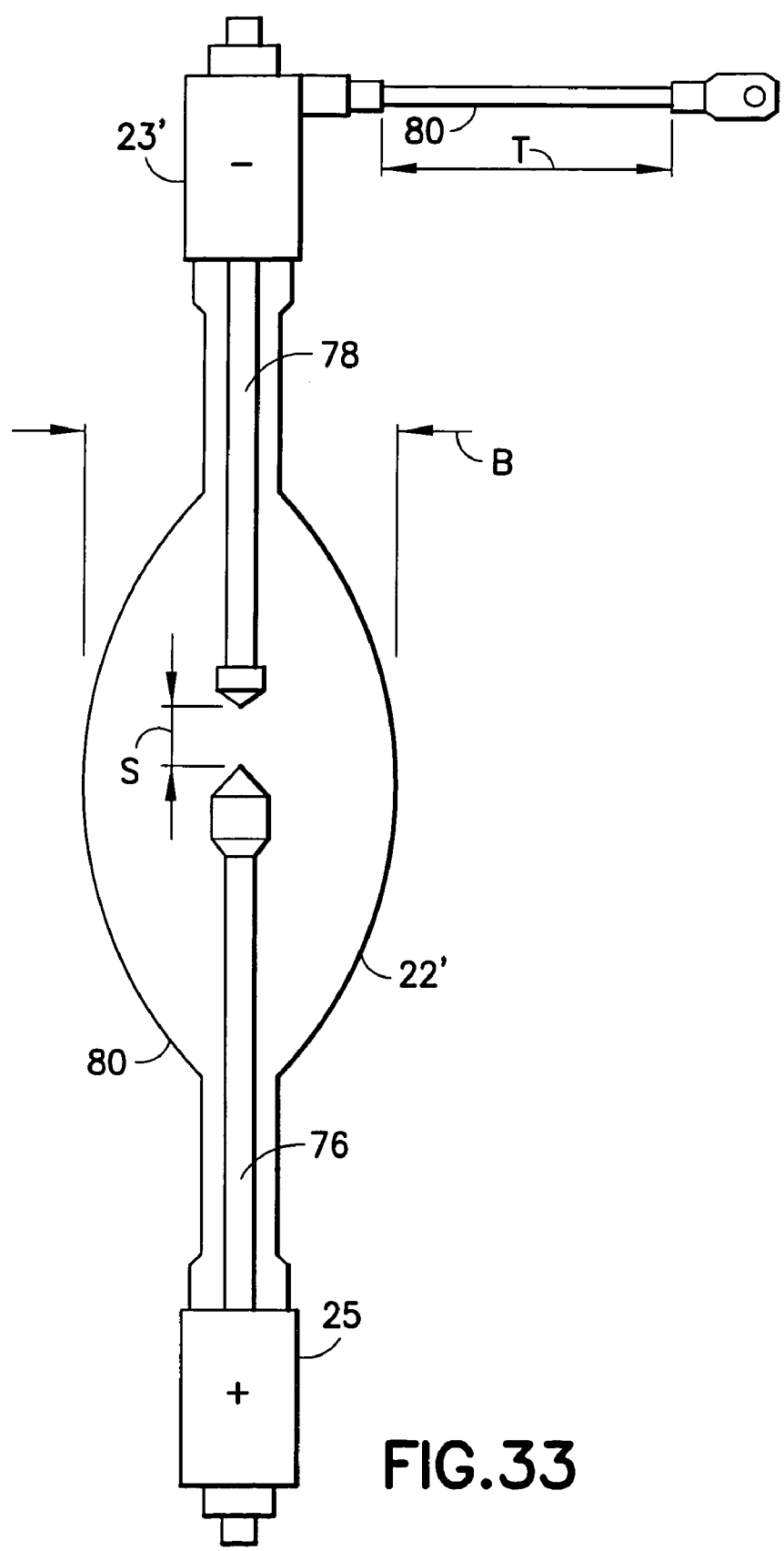
FIGS. 33–34 are diagrams showing relative dimensions of two bulbs for use in the illumination system disclosed herein.

Referring also to FIG. 33, an alternate embodiment of the bulb is shown. In this embodiment the bulb 22' is a 4200 Watt bulb. The bulb 22' comprises a front cathode end 25, a rear anode end 23', two electrodes 76, 78, and a glass section 80. The two electrodes 76, 78 are spaced from each other by a distance S. In this embodiment, the distance S is 2×6. The largest diameter B is 60 mm. The rear anode end 23' comprises a conductor lead 80. In this embodiment, the lead 80 has a length T of about 254 mm. In alternate embodiment, the length T could have any suitable length. With this type of embodiment, the rear end 23' can be electrically connected by the lead 80. Thus, the anode 44 can be replaced by an electrically insulative adaptor which merely functions to hold or mount the rear end 23' relative to the frame 16.

Figure 34:
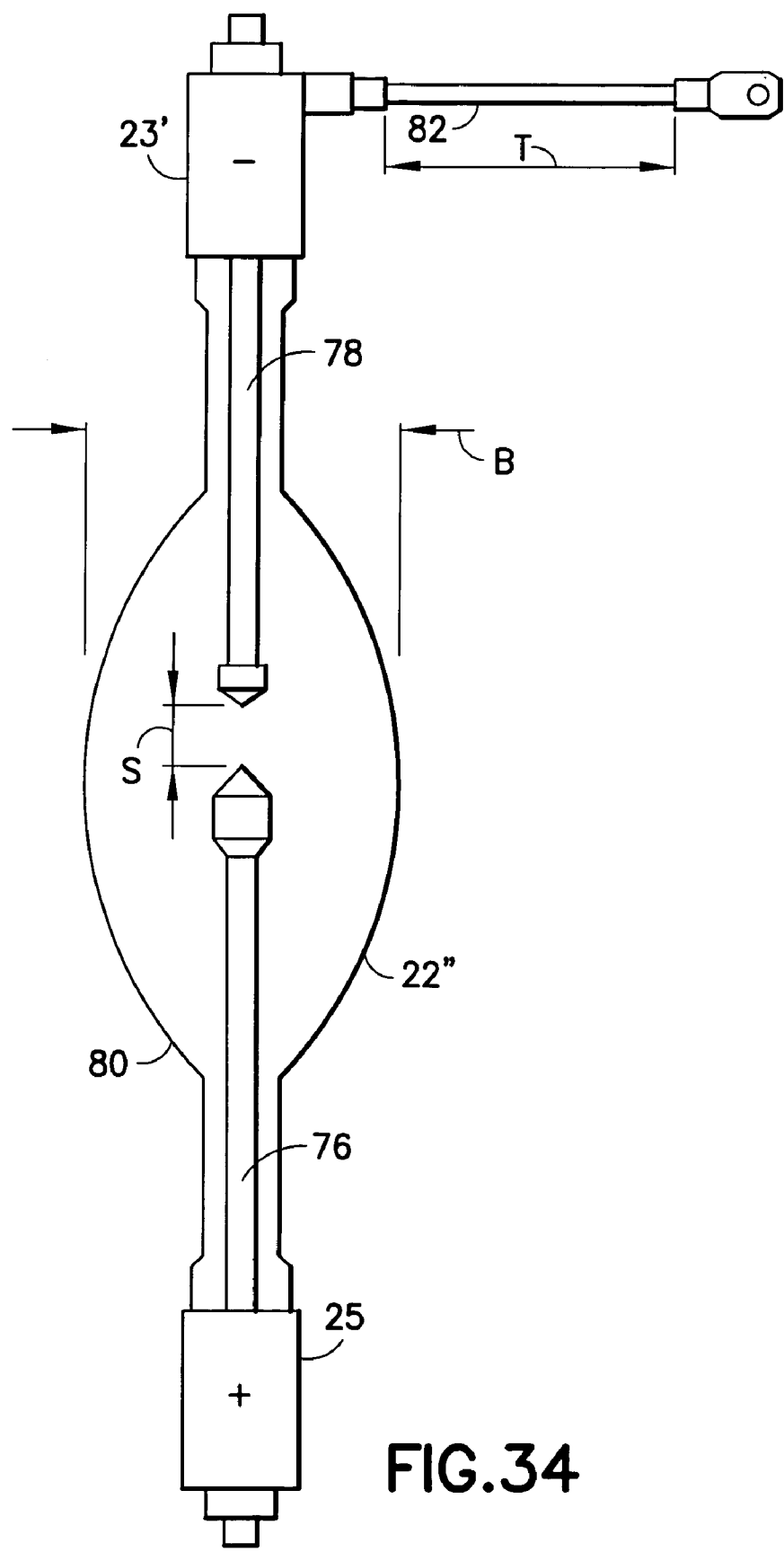

Referring also to FIG. 34, another alternate embodiment of the bulb is shown. In this embodiment the bulb 22" is a 5000 Watt bulb. The bulb 22" comprises a front cathode end 25, a rear anode end 23', two electrodes 76, 78, and a glass section 80. The two electrodes 76, 78 are spaced from each other by a distance S. In this embodiment, the distance S is 2×6. The largest diameter B is 62 mm. The rear anode end 23' comprises a conductor lead 80. In this embodiment, the lead 80 has a length T of about 254 mm. In alternate embodiment, the length T could have any suitable length. With this type of embodiment, the rear end 23' can the electrically connected by the lead 80. Thus, the anode 44 can be replaced by an a electrically insulative adaptor which merely functions to hold or mount the rear end 23' relative to the frame 16. In a preferred embodiment, the bulb 22" would be used with a reflector having a rear hole about 10 mm larger than the diameter B, such as 72 mm in diameter.

Referring particularly to FIG. 5, a front end view of the bulb 22 and reflector 20 is shown when the lamp bulb is substantially perfectly centered relative to the reflector. The lamp bulb and reflector are sized and shaped such that an operator looking rearward from a front side of the lamp bulb and reflector, and looking generally coaxially relative to a center longitudinal axis of the lamp bulb, can see a general ring shaped gap 62 between the reflector and the lamp bulb when the lamp bulb is properly aligned relative to the reflector. In the embodiment shown, the gap 62 has a thickness of about 10 mm. With the present invention, the reflector is aligned first and then the bulb is aligned.

When the bulb 22 is mounted inside the lamp house section, the rear end 23 of the bulb is located at a fixed known position inside the frame 16 because of the stationery attachment of the anode/adaptor 44/54 or 44' to the frame 16. When the reflector 20 is mounted inside the lamp house section, its position is also substantially stationarily fixed at a fixed known position inside the frame 16. Thus, the rear end 23 of the bulb 22 is maintained at a constant position relative to the reflector 20. The front end 25 of the bulb 22 is attached to the cantilevered arm 48 and is movably adjustable in vertical directions and horizontal directions to allow the bulb 22 to be properly aligned with the reflector 20. FIG. 5 shows the gap 62 when the bulb 22 is properly aligned with the reflector 20. The gap 62 is substantially uniform. If the bulb 22 is not properly aligned with the reflector 20, the gap 62 will become non-uniform. It should be noted that the center 52 of the bulb 22 is actually spaced forward from the hole 60. However, the gap 62 is a visual alignment indicator for the two longitudinally spaced items 52, 60.

If the front 25 of the bulb 22 is too low or too high, the bottom of the gap 62 or the top of the gap 62, respectively, will be relatively smaller than the other portions of the gap; or even non-existent if the vertical alignment is significantly off. An operator, looking rearward from the front side of the bulb and reflector, can immediately see a vertical out-of-alignment condition based upon non-uniformity of the gap 62. The operator can than merely adjust the cantilevered arm 48, such as bending the arm, to move the front end 25 of the bulb 22 to a centered position; using the change in the shape of the gap 62 as a visual guide. Likewise, if the front 25 of the bulb 22 is too far to the left or too far to the right, the left side of the gap 62 or the right side of the gap 62, respectively, will be relatively smaller than the other portions of the gap; or even non-existent if the horizontal alignment is significantly off. An operator, looking rearward from the front side of the bulb and reflector, can immediately see a horizontal out-of-alignment condition based upon non-uniformity of the gap 62. The operator can than merely adjust the cantilevered arm 48, such as bending the arm, to move the front end 25 of the bulb 22 to a centered position; using the change in the shape of the gap 62 as a visual guide. Because the diameter C of the hole 60 is larger than the diameter B of the bulb, the visual alignment indicator provided by the gap 62 is provided. In an alternate embodiment, the diameter C could be smaller than the diameter B such as when the reflector 20 is provided with a marking or indicia on its reflective surface to form the visual functional equivalent of the enlarged hole 60. However, the enlarged hole 60 helps to reduce a shadow generated by the section 52 if the enlarged hole was not provided.

In the past, with a conventional motion picture film projector, it could take about 5 hours to properly adjust alignment of the bulb and- reflector. The lens was replaced with an alignment tool to accomplish the task. With the present invention, on the other hand, alignment can be accomplished in as little as 15 minutes. This is an obvious savings in time; especially for periodic maintenance. In addition, with a conventional motion picture film projector, alignment would only be about 95 percent accurate. With the present invention, on the other hand, alignment can be about 100 percent accurate.

Figure 7A:
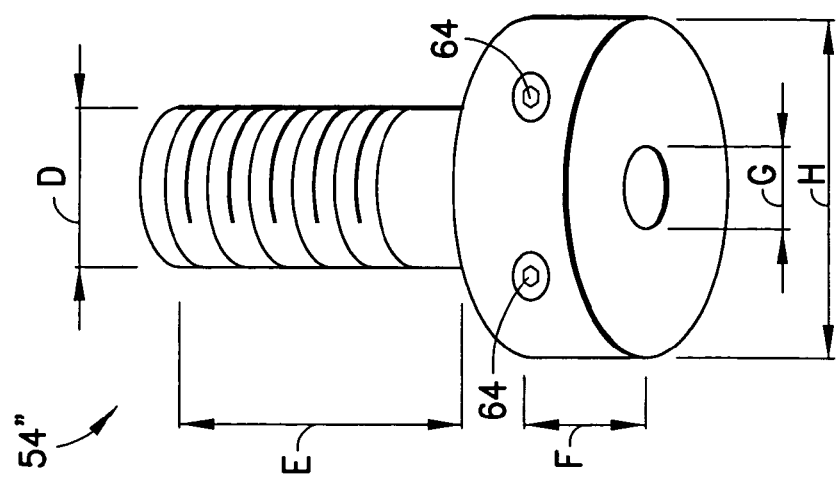
Figure 7B:
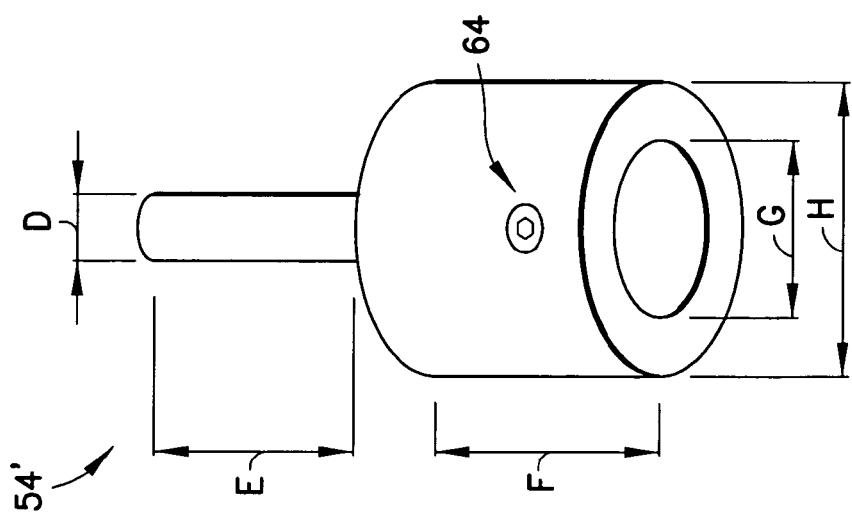
Figure 8:
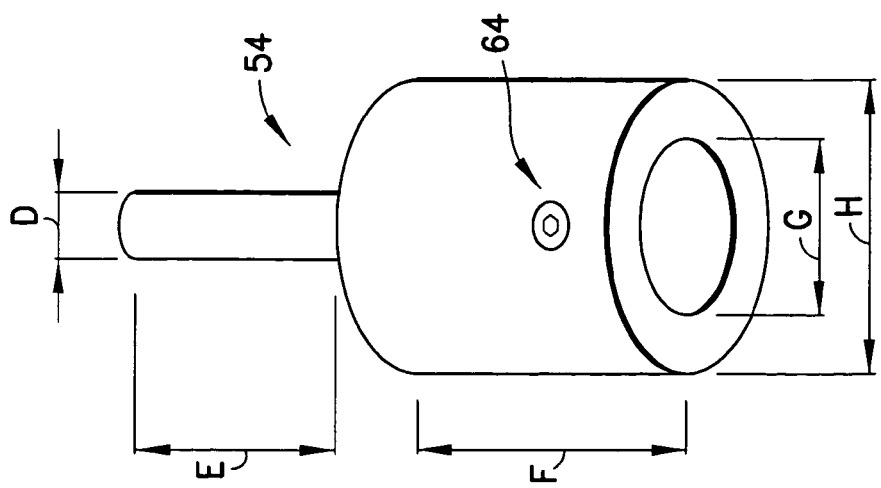

Referring now to FIGS. 7A, 7B and 8, alternate embodiments of the rear end adaptor 54 are shown. In FIG. 7A, the adapter 54 has dimensions D, E, F, G and H. In this embodiment D is 7.95 mm, E is 19.3 mm, F is 26.92 mm, G is 14.07 mm and H is 25.4 mm. The adapter 54 has a hex set screw 64, such as a 10–32 hex set screw, for the rear end 23 of the bulb. In FIG. 7B, the adapter 54' has dimensions D is 7.91 mm, E is 19.36 mm, F is 19.2 mm, G is 14.15 mm and H is 25.34 mm. The adapter 54' has a hex set screw 64, such as a 10–32 hex set screw, for the rear end 23 of the bulb. In FIG. 8, the adapter 54" has dimensions D is 12.94 mm with a threaded section, E is 25.48 mm, F is 9.61 mm, G is 7.98 mm and H is 25.4 mm. The adapter 54" has two hex set screws 64, such as a 10–32 hex set screw, for the rear end 23 of the bulb. However, in alternate embodiments, any suitable dimensions could be provided and any suitable bulb attachment system or anode attachment system could be provided.

Figure 13:
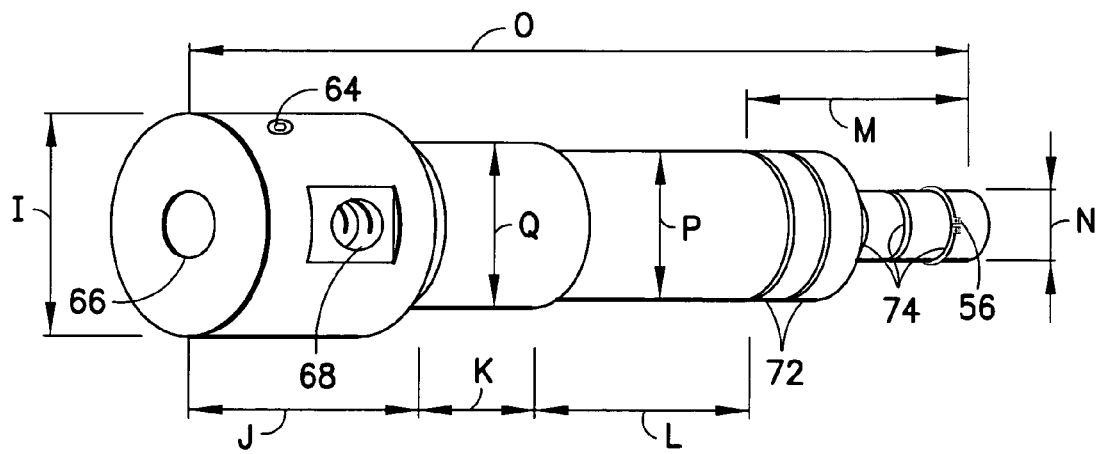

Referring also to FIGS. 12A, 12B and 13, alternate embodiments of the enlarged length anode 44' are shown. In FIG. 12A, the anode 44' has dimensions I, J, K, L, M, N and O. In the embodiment shown, I is 25.5 mm, J is 28.5 mm, K is 135 mm, L is 35 mm, M is 17 mm, N is 12.6 mm, and O is 215.5 mm. The anode 44 has a front hole 66 which is adapted to receive the rear end 23 of the bulb. In the embodiment shown, the front hole 66 has a diameter of about 8 mm. The front side of the anode comprises a threaded hole 68. The hole 68 is adapted to receive a fastener for attaching the electrical conductor 70 (see FIG. 1) to the anode. A hex screw 64 is provided for fixedly attaching the rear end 23 of the bulb to the extended length anode.

In FIG. 12B, the anode 44" has the following dimensions: I is 25.5 mm, J is 38.5 mm, K is 43 mm, L is 43.75 mm, M is 31.5 mm, N is 12.6 mm, and O is 157 mm, and P is 22.2 mm. The anode 44" has a front hole 66 which is adapted to receive the rear end 23 of the bulb. In the embodiment shown, the front hole 66 has a diameter of about 14 mm. The front side of the anode comprises a threaded hole 68. The hole 68 is adapted to receive a fastener for attaching the electrical conductor 70 (see FIG. 1) to the anode. The anode also comprises two removable spacers 72 attached to the rear end of the anode. The spacers 72 can be used or not used to adjust the effective length of the anode projecting forward from the rear side of the frame 16. The rear end of the anode also comprises two grooves 74 which are adapted to alternatively receive the mounting clip 56. A hex screw 64 is provided for fixedly attaching the rear end 23 of the bulb to the extended length anode.

In FIG. 13, the anode 44''' has the following dimensions: I is 30 mm, J is 28.5 mm, K is 24.5 mm, L is 43 mm, M is 36 mm, N is 12.6 mm, O is 132 mm, P is 22.5 mm, and Q is 25.5 mm. The anode 44''' has a front hole 66 which is adapted to receive the rear end 23 of the bulb. In the embodiment shown, the front hole 66 has a diameter of about 14 mm. The front side of the anode comprises a threaded hole 68. The hole 68 is adapted to receive a fastener for attaching the electrical conductor 70 (see FIG. 1) to the anode. The anode also comprises two removable spacers 72 attached to the rear end of the anode. The spacers 72 can be used or not used to adjust the effective length of the anode projecting forward from the rear side of the frame 16. The rear end of the anode also comprises three grooves 74 which are adapted to alternatively receive the mounting clip 56. A hex screw 64 is provided for fixedly attaching the rear end 23 of the bulb to the extended length anode. FIGS. 12A, 12B and 13 are merely examples. In alternate embodiments, any suitable dimensions could be provided and any suitable bulb attachment system or anode attachment system could be provided.

Figure 4:
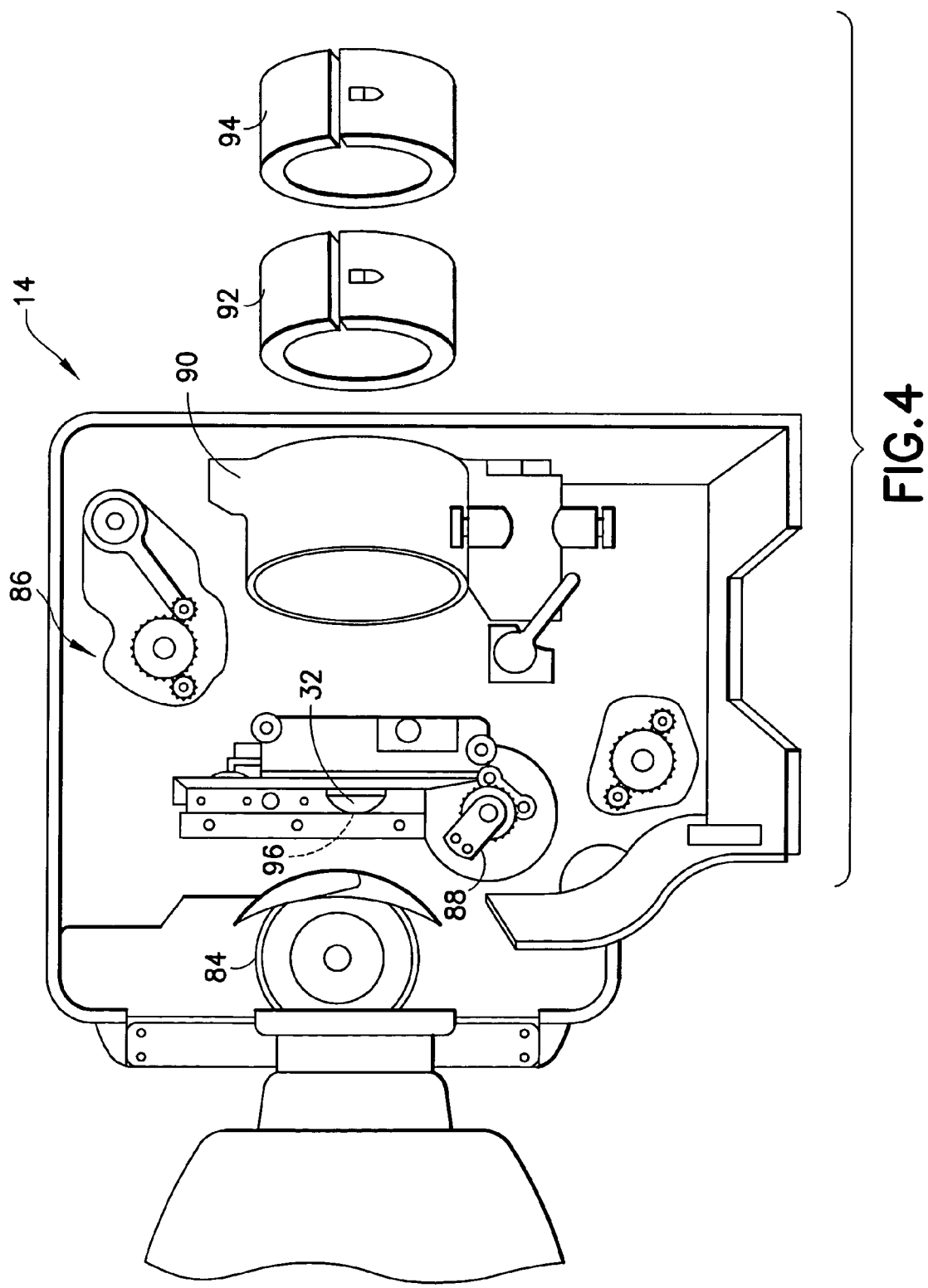
FIG. 4 depicts modifications to one embodiment of a projector head.

Referring now to FIGS. 1 and 4, FIG. 4 shows an enlarged view of the head section 14. The head section 14 comprises a shutter 84, a film drive system 86 comprising an intermittent or pull down 88, and a lens mount 90 for receiving collars 92, 94 adapted to hold lens. In this embodiment, the shutter 84 comprises a 72 degree shutter instead of a customary 90 degree shutter. In an alternate embodiment, the shutter 84 could be any suitable type of shutter including less than 85 degrees, such as a 70 degree shutter for example. The intermittent 88 comprises a high-speed intermittent. In an alternate embodiment, the intermittent 88 could comprise a regular speed intermittent.

Shutters less than 85 degrees have not been used in conventional motion picture film projectors in the past because of wash over of light from the lamp house section which causes a travel ghost on the screen. However, it has been found by a locating the lamp bulb 22 closer to the head section 14, a shutter less than 85 degrees can be used without significant wash over of light from the lamp house and without significant travel ghost. Features of the present invention can be used with a 72 degree shutter as noted above. The smaller angle shutter allows more light to pass from the lamp house section to the film traveling past the aperture at the gate 32 per revolution of the shutter. This allows a brighter image to be projected on the screen.

In the past, a smaller degree of shutter was not used and the lamp bulb was not moved closer to the head section because of risk of thermal damage to the film traveling past the gate 32. However, by use of the infrared filter, and improved reflective surface and shape of the reflector 20, and a smaller wattage bulb 22 then used in conventional motion picture film projectors, more light can be transmitted through the smaller angle shutter without significantly increasing the risk of thermal damage to the film. With the present invention, the rear end of the reflector is also moved closer to the front of the lamp house.

The high speed intermittent 88 can be used to adjust the film movement to account for the smaller angle shutter 84. High speed intermittents were used in the 1950's but were substantially discontinued based upon damage to the film. It has been discovered that a high speed intermittent can be used if the gate 32 is flat rather than having a curved gate; which was used back in the 1950's. However, it has been discovered that a shutter which has a smaller angle than a 90 degree shutter can be used with a regular intermittent. Therefore a high speed intermittent does not need to be used.

The lens mount 90 is adapted to removably receive the collars 92, 94, and allow the collars to be rotated, and fix the collars relative to the lens mount 90 at a stationary position. In the embodiment shown, the head section 14 is configured for a wide screen or flat projection rather than a full screen or scope projection. However, features of the present invention could be used with a motion picture film projector configured for a full screen or scope projection. The first collar 92 comprises a 4 inch eccentric collar for a flat lens. The second collar 94 comprises a 4 inch regular collar for an eccentric anamorphic lens. The first collar 92 can be axially rotated and, because of its eccentricity, can adjust the positioning of the image on the screen, such as to adjust for an off-center plate aperture 96 because of a manufacturing defect of the aperture through the plate or to adjust for improper plate installation. FIG. 10 shows a perspective view of the collars 92. In this embodiment, the collar 92 has the following dimensions: U is 14.5 mm, V is 16.5 mm, W is 44.2 mm, and x is 101.5 mm. However, this is merely an example of some dimensions. Any suitable dimensions could be used. An open gap 98 is provided which can be closed by tightening a hex screw 100 to clamp a lens inside the collar 92.

Figure 11:
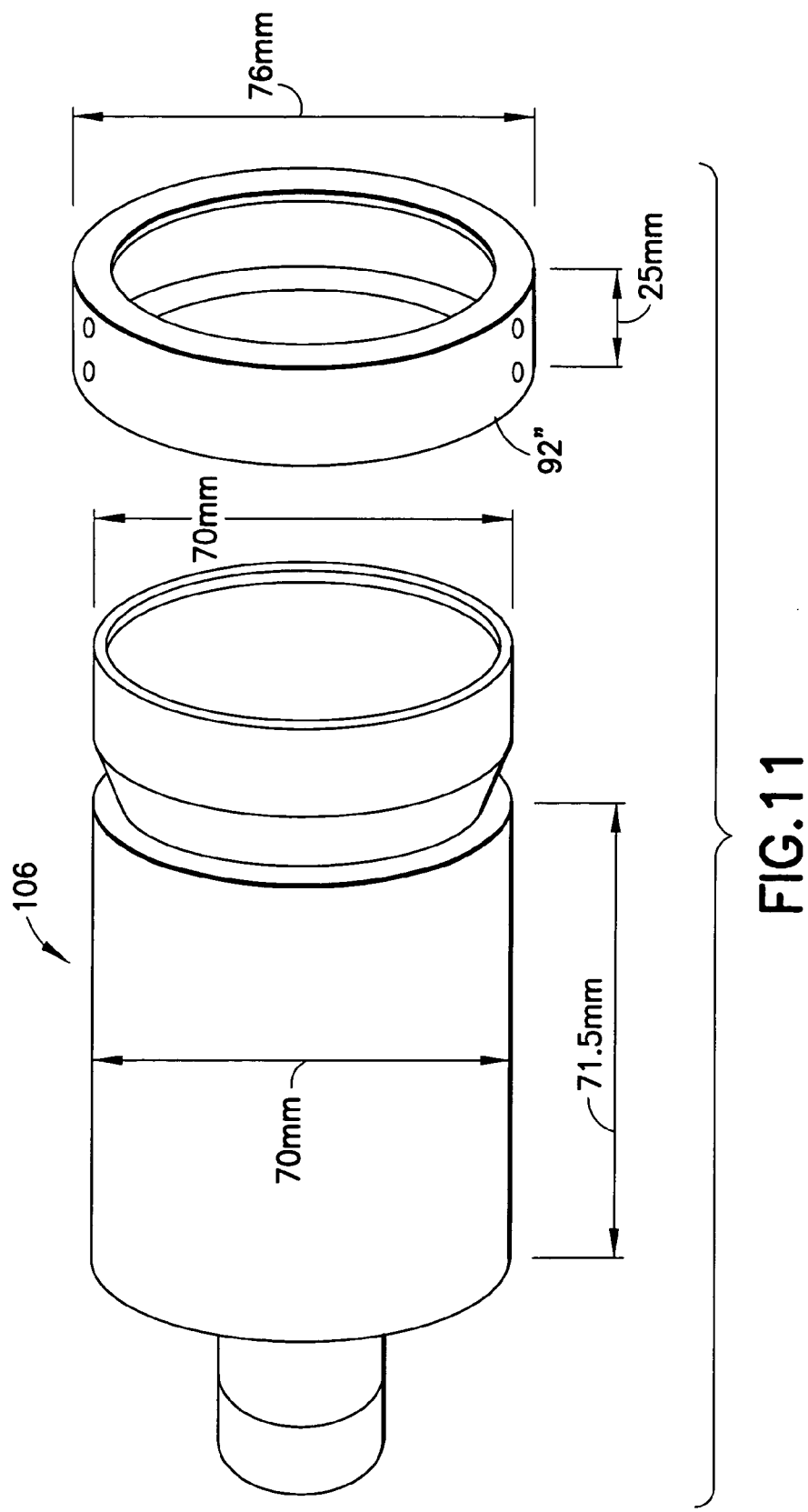

FIG. 9 shows an alternate embodiment of an anamorphic eccentric collar adaptor 102. The collar adaptor 102 is adapted to be positioned inside the lens mount 90 and stationarily attached thereto. The collar adaptor 102 is adapted to receive an alternate type of eccentric collar 92'. The collar 92' can be rotated relative to the adaptor 102 with a 1 mm off-center eccentricity. A hex set screw 104 can be tightened to stationarily attach the collar 92' to the adaptor 104. FIG. 11 shows an alternate embodiment of a variable lens 106. An eccentric collar 92" with a flat lens can be attached to the front side of the variable lens 106. The collar 92" can be rotated to adjust the location of the image on the screen; vertically and/or horizontally. The embodiment shown in FIG. 9 can be used to reduce cornering of the image. In other words, the image at the corners of the screen will not be lost or of weak luminance.

Figure 14:
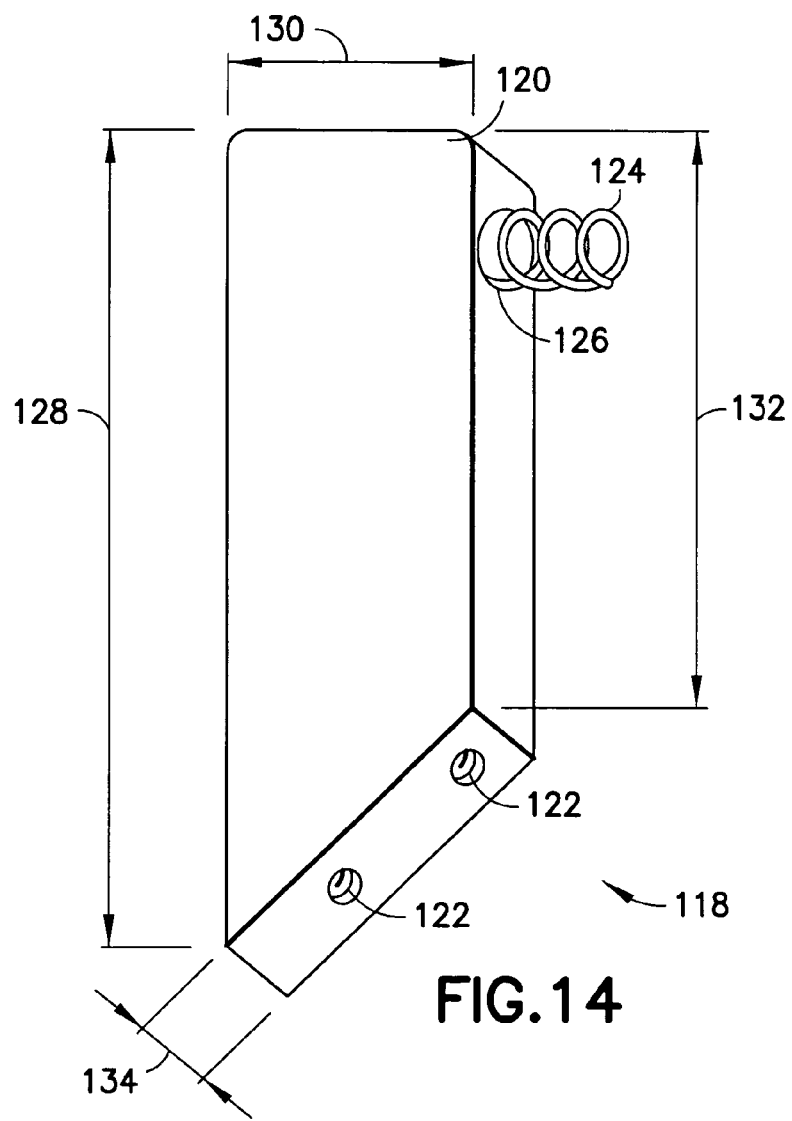
Figure 15:
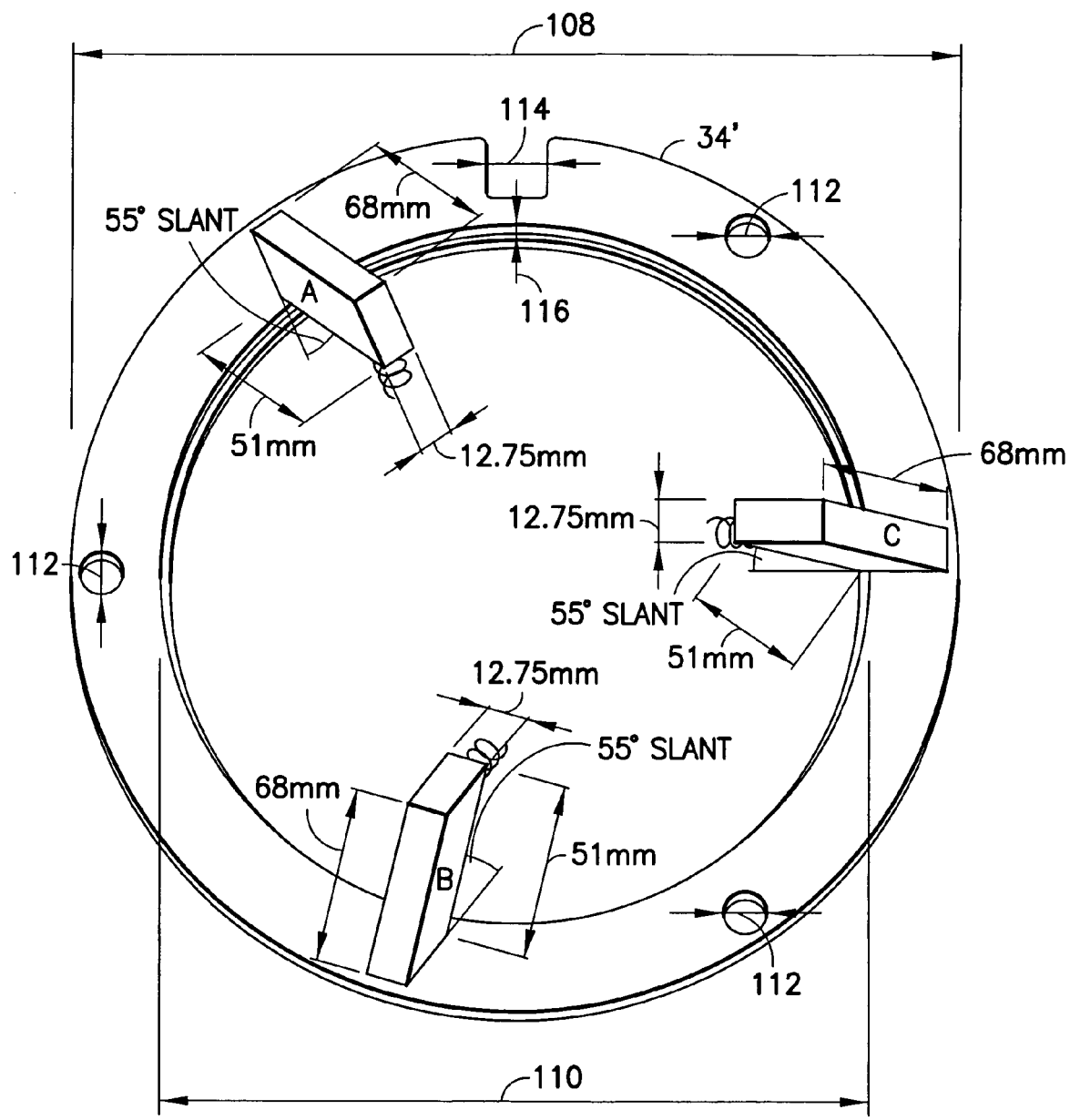

Referring now also to FIGS. 14 and 15, one embodiment of the reflector mounting system for use with a BIG SKY lamp house is shown. The retrofit reflector bracket 34' has the following dimensions: outer diameter 108, inner diameter 110, mounting hole diameter 112, recess width 114, and lip width 116. In the embodiment shown, the outer diameter 108 is 356.5 mm, inner diameter is 280 mm, mounting hole diameter 112 is 17.5 mm, recessed width 114 is 25.2 mm, lip width 116 is 5 mm. Three post and spring assemblies 118 are attached to the bracket 34' on a rear side of the bracket. In the embodiment shown, each post 120 is attached to the bracket 34 at two threaded holes 122. The holes 122 extend into an angled flange mounting side of the post 120. The angled side is preferably adapted to provide an angle of about 55 degrees. The spring 124 extends from a hole 126 in the post 120. The spring 124 is a coil spring and preferably comprises a 10 mm diameter and a 25 mm length which is recessed into the hole 126 8 mm deep. The post has the following dimensions: 128 is 68 mm, 130 is 15 mm, 132 is 51 mm and 134 is 12 mm. The dimensions noted above with respect to FIGS. 14 and 15 are exemplary dimensions only, but have been found to be the best dimensions for the retrofit of a BIG SKY lamp house.

Figure 16:
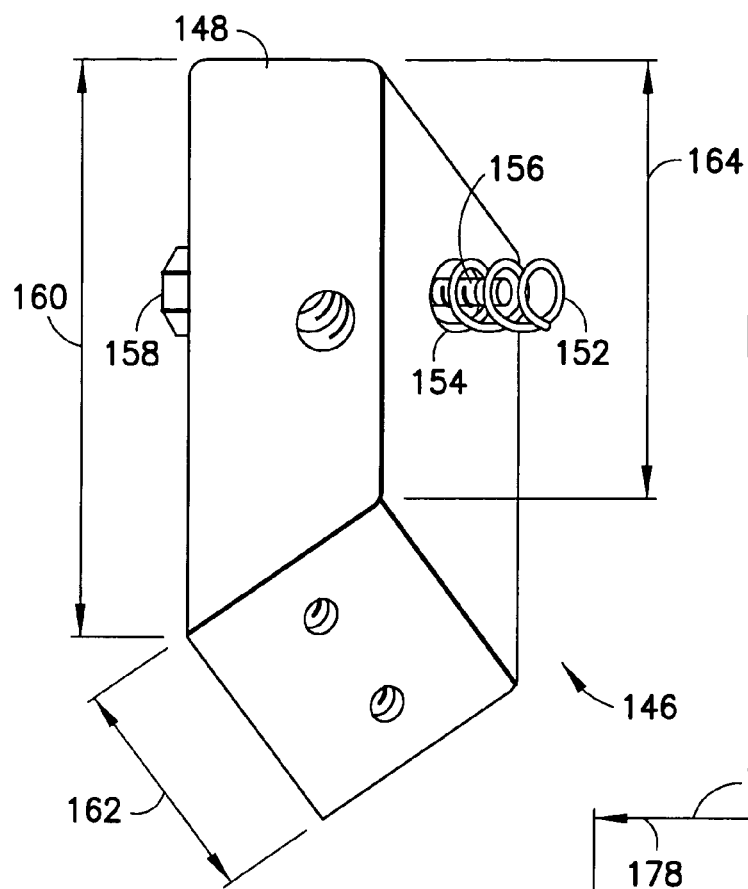
Figure 17:
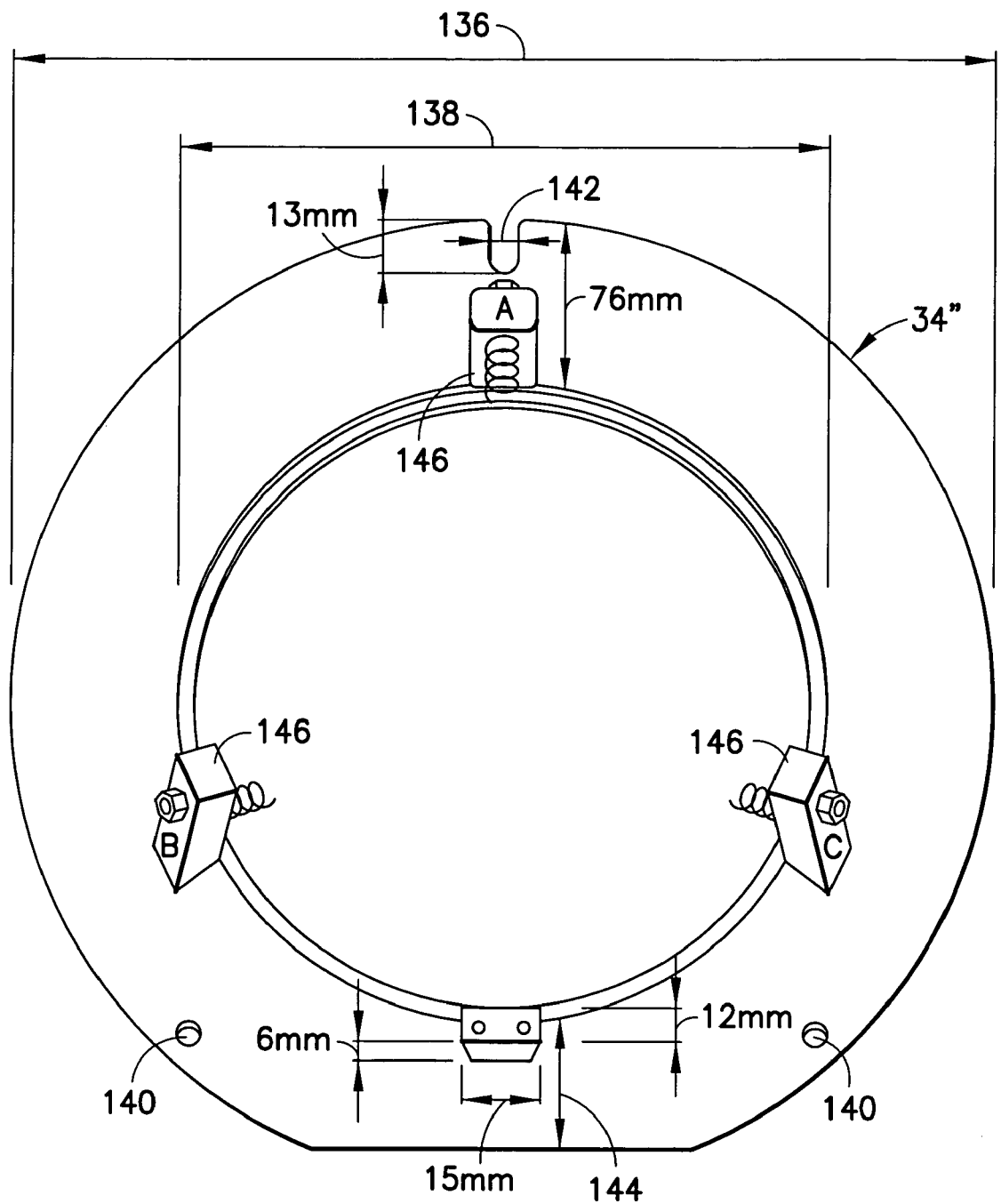

Referring now also to FIGS. 16 and 17, one embodiment of the reflector mounting system for use with a STRONG lamp house is shown. The retrofit reflector bracket 34" has the following dimensions: outer diameter 136, inner diameter 138, mounting hole diameter 140, recess width 142, and height 144. In the embodiment shown, the outer diameter 136 is 430 mm, inner diameter 138 is 280 mm, mounting hole diameter 140 is 8 mm, recessed width 142 is 7 mm, height 144 is 61 mm. Three post and spring assemblies 146 are attached to the bracket 34" on a rear side of the bracket. In the embodiment shown, each post 148 is attached to the bracket 34 at two threaded holes 150. The holes 150 extend into an angled flange mounting side of the post 148. The angled side is preferably adapted to provide an angle of about 55 degrees. The spring 152 extends from a hole 154 in the post 148. The spring 152 is a coil spring and preferably comprises a 10 mm diameter and a 20 mm length which is recessed into the hole 154 10 mm deep. A screw 156 extends through the hole 154 and is attached to a locking nut 158. The post has the following dimensions: 160 is 36 mm, 162 is 19 mm, and 164 is 275 mm. The dimensions noted above with respect to FIGS. 16 and 17 are exemplary dimensions only, but have been found to be the best dimensions for the retrofit of a STRONG lamp house.

Figure 18:
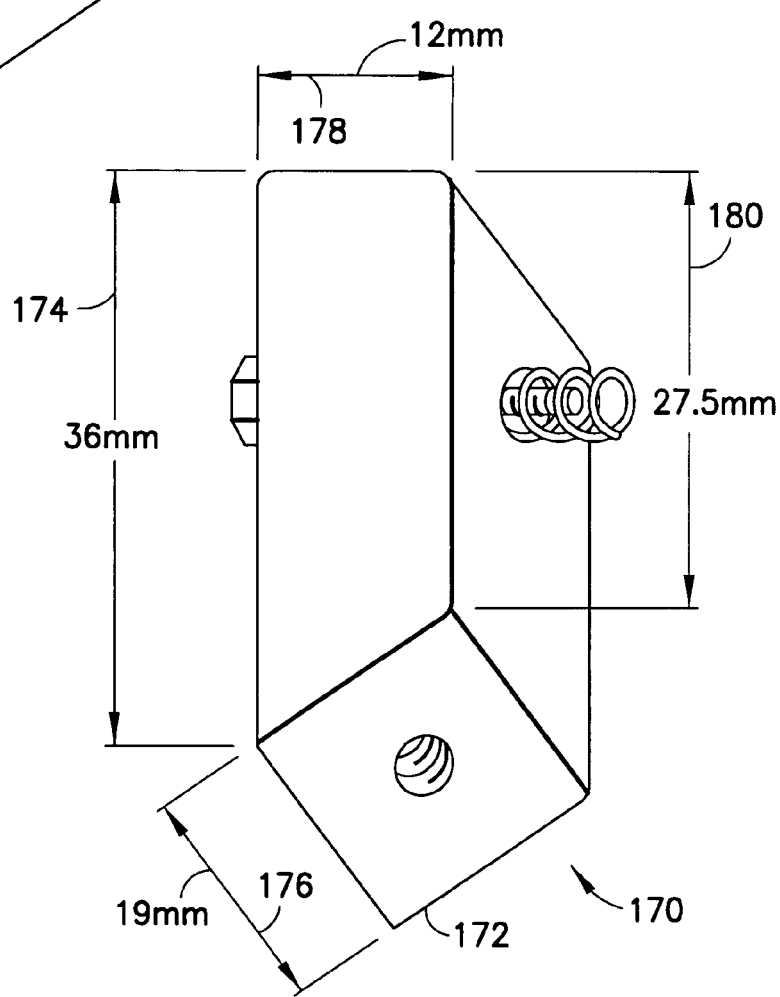
Figure 19:
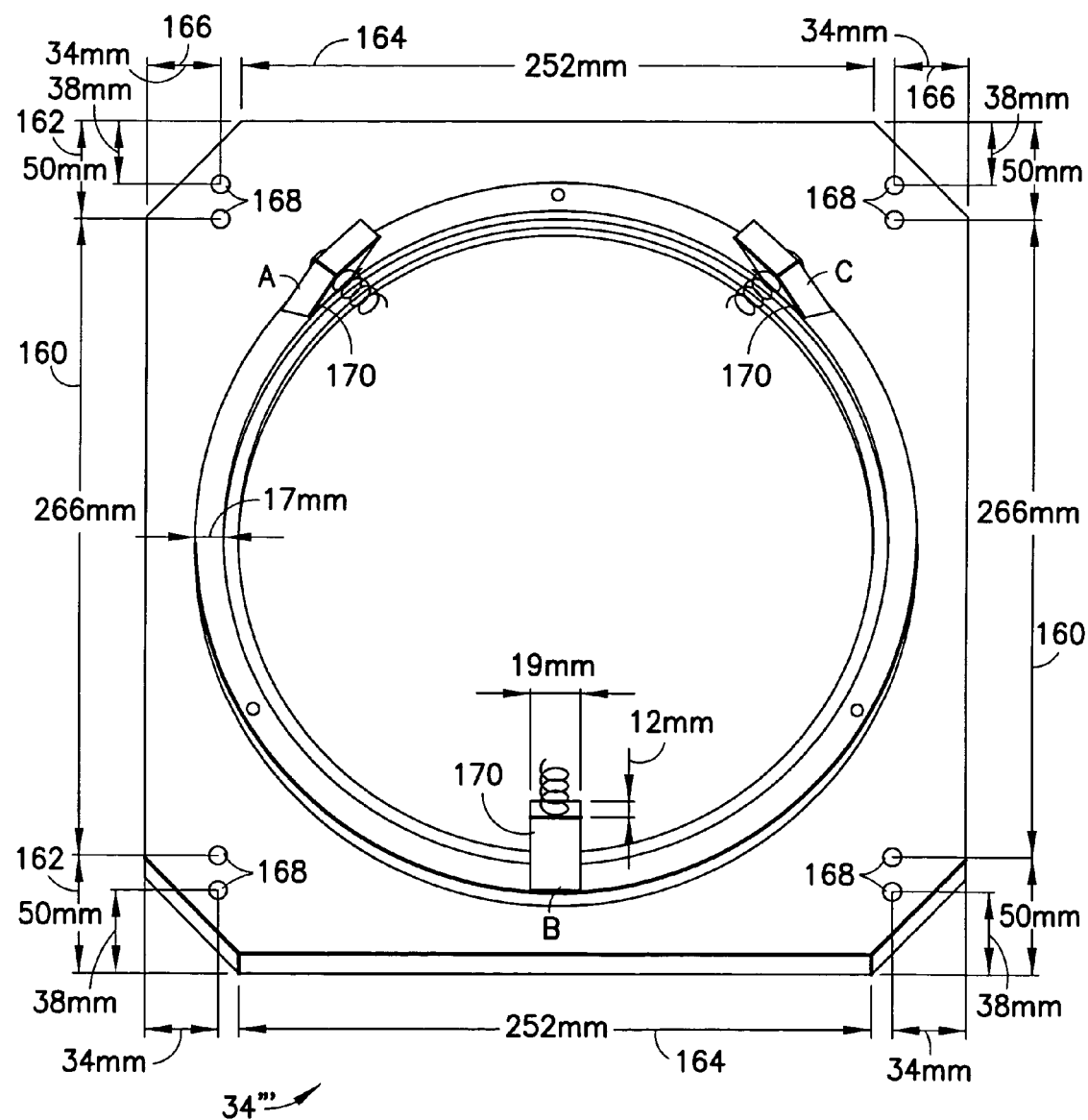

Referring now also to FIGS. 18 and 19, one embodiment of the mounting system for use with a CHRISTIE SLC 45 lamp house is shown. The retrofit reflector bracket 34''' has the following dimensions: vertical sides 160 are 266 mm, short vertical sides 162 are 50 mm, horizontal sides 164 are 252 mm, short vertical sides 166 are 34 mm to the mounting holes 168, pairs of the vertically arranged mounting holes 168 are spaced 12 mm apart and the first hole 38 mm from the horizontal sides and 34 mm from the vertical sides. The inner flange with the lip is 17 mm wide. Post and spring assemblies 170 have a post 172 with dimensions 174 of 36 mm, 176 of 19 mm, 178 of 12 mm, and 180 of 27.5 mm. The angled bottom side has a threaded mounting hole 182. A spring 184 is provided in hole 184 with a lock nut 186 and screw 188. The dimensions noted above with respect to FIGS. 18 and 19 are exemplary dimensions only, but have been found to be the best dimensions for the retrofit of a CHRISTIE SLC 45 lamp house.

Figure 20:
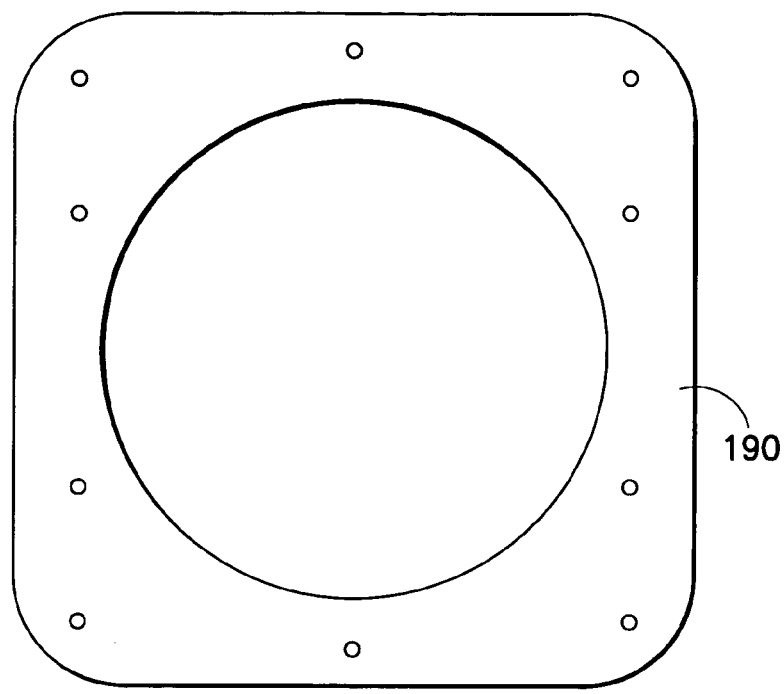
Figure 21:
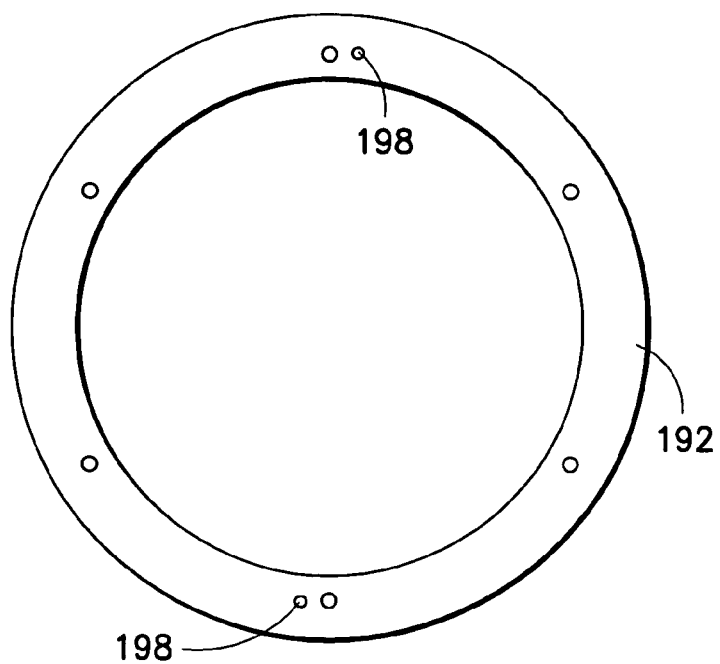
Figure 22:
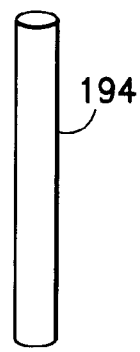
Figure 23:
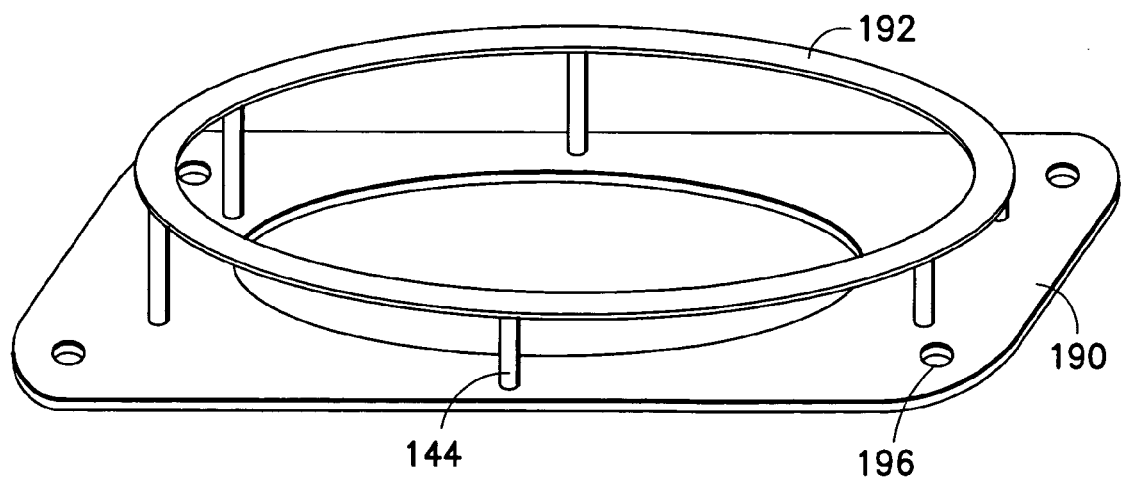

FIG. 23 shows one embodiment of the mounting system for use with a CHRISTIE SLC SERIEC lamp house. FIGS. 20–22 show components of the mounting system shown in FIG. 23. The mounting system generally comprises an aluminum base 190, an aluminum top ring 192 and a plurality of aluminum spacer rods 194. The top ring 192 is attached to the base 190 by the spacer rods 194. The base 190 comprises screw holes 196 for attaching the base to the mounting flange inside the Christie SLC SERIEC. The top ring 192 comprises registration pins 198. The base 190 has a center hole with a size of about 266.7 mm. The rods 194 have a height of about 55 mm.

Figure 24A:
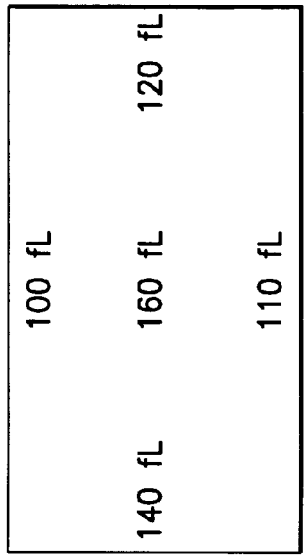
Figure 24B:
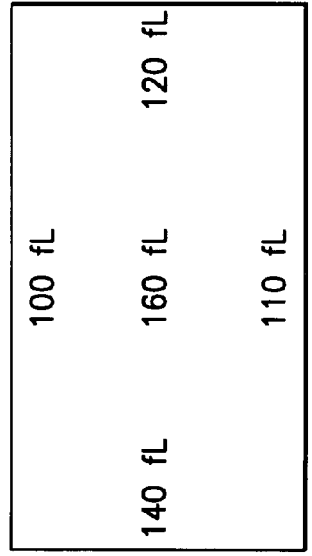
Figure 24C:
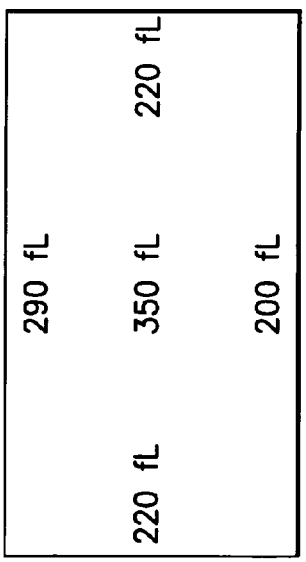
Figure 24D:
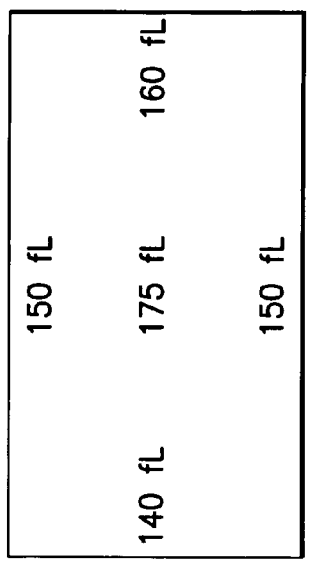

Referring now to FIGS. 24A–24D, rectangles are shown to represent a screen at a throw of 9 feet with numbers on the screen to represent actual illumination in foot-lamberts (fL). The comparisons were made using a Simplex XL equipped with a standard shutter, standard speed intermittent and a 1 inch focal lenses. FIG. 24A is for a 4,200 W bulb at 150A incorporating features of the present invention as shown in FIG. 1. FIG. 24B shows illumination for a 7,000 W bulb at 150A in a conventional STRONG projector. FIG. 24C is for a 3,000 W bulb at 100A using the features of the present invention. FIG. 24D is for a 7,000 W bulb at 150A using a conventional STRONG projector. As can be seen, the illumination on the screen in FIG. 24A is much brighter than the illumination on the screen in FIG. 24B. In comparing the embodiment used to produce the illumination in FIG. 24A to the equipment used to produce the illumination in FIG. 24B, an improvement of 55 percent with 20 percent better uniformity and outstanding definition is provided. The illumination on the screen in FIG. 24C with a 3,000 W bulb at 100A is even brighter than the illumination with the 7000 Watt bulb shown in FIG. 24D. In comparing the embodiment used to produce the illumination in FIG. 24C to the equipment used to produce the illumination in FIG. 24D, the present invention can provide an improvement of 9 percent with 23 percent better uniformity and a outstanding definition.

FIG. 25 shows samples of screen luminance readings by zone in foot-lamberts on a first screen using a STRONG lamp house model SH 2 with a wattage of cxl-70 sc, at 162 Amps and 42 Volts, a conventional STRONG reflector, with a 7,000 Watt CHRISTIE lamp bulb, and in a scope format. The lamp bulb had about 540 hours of use. FIG. 26 shows screen luminance readings on the same screen, the same model lamp house with an OSRAM bulb wattage of xbo4200 w/gs, 152 Amps, 28 volts, with the present invention reflector and 4200 watt bulb as seen in FIG. 1 in a scope format. The lamp bulb was new. As can be seen in comparing FIG. 26 to FIG. 25, with the present invention the screen luminance is brighter in most zones.

FIG. 27 shows samples of the screen luminance readings by zone in foot-lamberts on the same first screen using a STRONG lamp house model SH 2 with a wattage of cxl-70 sc, at 162 Amps and 42 Volts, a conventional STRONG reflector, with a 7,000 Watt CHRISTIE lamp bulb, similar to the system for FIG. 25, but in a flat format. FIG. 28 shows screen luminance readings on the same screen, the same model lamp house with an OSRAM bulb wattage of xbo4200 w/gs, 152 Amps, 28 volts, with the present invention reflector and 4200 watt bulb as seen in FIG. 1 and the same configuration used to produce FIG. 26, but in a flat format. As can be seen in comparing FIG. 28 to FIG. 27, with the present invention the screen luminance is brighter in flat mode also.

FIG. 29 shows samples of the screen luminance readings by zone in foot-lamberts on a second screen using a STRONG lamp house model SH 2 with a wattage of cxl-70 sc, at 165 Amps and 42 Volts, a conventional STRONG reflector, with a 7,000 Watt CHRISTIE lamp bulb, and in a scope format. The lamp bulb was new with only 10 hours of use. FIG. 30 shows screen luminance readings on the same screen, the same model lamp house with an OSRAM bulb wattage of xbo4200 w/gs, 148 Amps, 18 volts, with the present invention reflector and 4200 watt bulb as seen in FIG. 1 in a scope format. The lamp bulb was new. As can be seen in comparing FIG. 30 to FIG. 29, with the present invention the screen luminance is brighter in most zones.

FIG. 31 shows samples of the screen luminance readings by zone in foot-lamberts on the second screen using a STRONG lamp house model SH 2 with a wattage of cxl-70 sc, at 165 Amps and 42 Volts, a conventional STRONG reflector, with a 7,000 Watt CHRISTIE lamp bulb, configured the same as that which produced FIG. 29, but in a flat format. The lamp bulb was new with only 10 hours of use. FIG. 32 shows screen luminance readings on the same screen, the same model lamp house with an OSRAM bulb wattage of xbo4200 w/gs, 148 Amps, 18 volts, with the present invention reflector and 4200 watt bulb as seen in FIG. 1 and configured the same as that which produced FIG. 30, but in a flat format with a flat lens. The lamp bulb was new. As can be seen in comparing FIG. 32 to FIG. 31, with the present invention the screen luminance is brighter in most locations.

Figure 35:
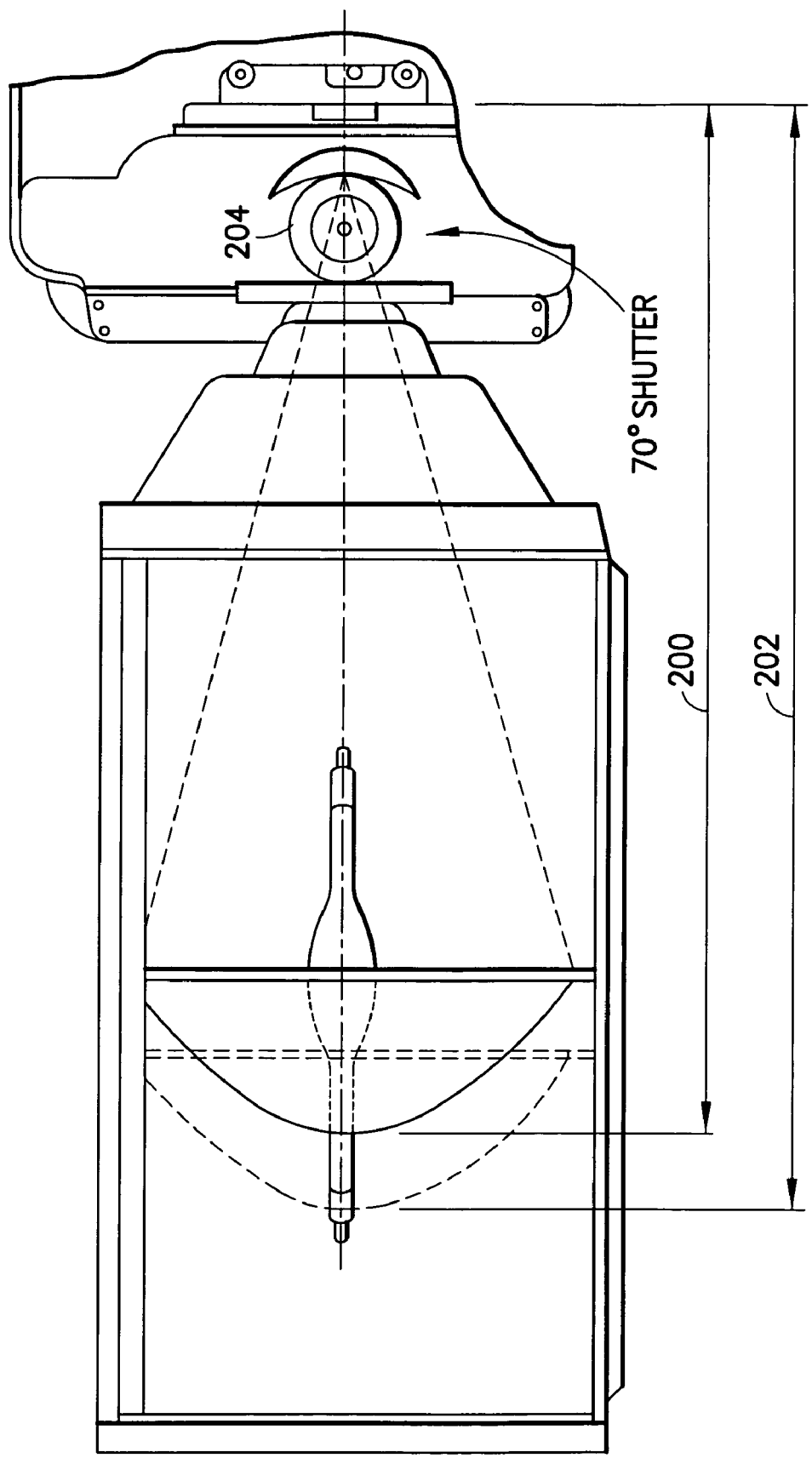
FIG. 35 is a diagram showing implementation of the present invention with a 70 degree shutter.

Referring now to FIG. 35, using a standard intermittent movement, a 70 degree shutter on any 35 mm model projector is possible using the following process. A 280 mm cold or hot reflector, as described with reference to FIG. 1, with a working optical distance at F2 of 825 mm. The following variations will allow modifications of shutter sizes from a standard 90 degree shutter. Placed at a working distances (F2) between 200 and 202 of about 740 mm-770 mm, a shutter opening of 70 degrees is achieved with shutter 204 for a maximum light gain of 30 percent over standard shutters. Travel ghost is totally eliminated by a variation of the F2 distance with a 30 mm variant between lengths 200 and 202 depending on the size of the screen, projection distance and focal length of the lens. The conclusion is that there is a relationship between the reflector design, and all elements of the projector optical path which will allow a smaller degree shutter speed to be determined, as opposed to a fixed 90 degree shutter, without modifying the pull down ratio of the intermittent.

Disclosed herein are methods and apparatus for enhancing the illumination systems of various film projection apparatus. The illumination system disclosed herein provides for enhancements to existing systems through retrofit and optimization of aspects of those existing systems. In other embodiments, the teachings herein may be used for original installation of an illumination system.

The optimization process involves alignment of the optical path. That is, optimization accounts for and overcomes problems associated with inefficient design of existing systems. For example, optimization involves aligning a specific bulb with a specific reflector., such that the light generated is focused at the plane through which the film travels. In the optimization process, alignment is preferably 100% from the back of the lamp or bulb, to the middle of the lens.

In preferred embodiments, the system includes a Xenon arc-based light source and various reflectors of different material surfaces and parabolic configurations, which maximize the potential of a concentrated light beam on 16 mm, 35 mm and 70 mm or other embodiments of celluloid based motion picture film. The improvements are achievable in various formats, including 35 mm anamorphic (referred to as "scope" format), as well as a standard format having a "flat" bearing ratio.

For screens of 70 feet or more, the system can use a high-speed pull-down with a simplex X-L projector or Millennium, as well as a 72-degree shutter to obtain the most amount of light capable of passing through a 35 mm aperture at a maximum ratio of 2.35.

The system can incorporate an infra-red (IR) reduction process. Using heat filters of 100 mm, 127 mm or 139 mm, for example, along with the IR properties of the various reflectors, a heat reduction of up to 70% less than a 7000 watt system is achieved. In other embodiments, heat filters of other sizes are used. An exemplary installation of IR filters is provided in FIG. 2.

The system achieves greater efficiency through directing light produced by the bulb and parabola in such a way that the light travels through the film's emulsion with the greatest efficiency. The system can be tailored to specific projectors and lamp houses, either as a retro-fit kit or a complete projection system, which accommodates small screens up to screens as large as 150 ft wide or greater. FIG. 1 provides an overview of one type of illumination system disclosed herein.

First, optimization focuses on positioning the bulb in order to maximize the luminous intensity at the anode end of the bulb. One of several specifically designed Xenon bulbs is placed in conjunction with the ideal F1 (back of mirror to tip of negative end) of the reflector and configured to maintain the arc stability. One example of this is shown in FIG. 6. The bulbs can vary in shape, gap, and distance. The bulbs are commonly available at ratings of 550, 1000, 1600, 2000, 3000, 3600, 4200 and 5000 watts. It is considered, however, that the teachings herein may be used with these bulbs, or other bulbs having ratings other than the foregoing. Preferably, the bulb diameter does not substantially exceed 62 mm, and the arc of the bulb does not exceed 2 mm by 6.2 mm. FIGS. 33–34 show relative dimensions for two bulbs suited for use in the illumination system disclosed herein. There are currently six reflectors, which can be used with the system: two 280 mm, a 317 mm, a 400 mm and two 440 mm. However, the teachings herein may also be combined with reflectors other than the foregoing. For the system to function, the optical path alignment from the reflector to film plane is preferably no less than 95% accurate. Aspects of reflectors are illustrated in at least FIGS. 1, 3, 5 and 6.

In preferred embodiments, a relationship between bulb and reflector accounts for a vertex opening of the reflector which does not exceed bulb diameter (i.e., an opening of 70 mm does not have a bulb larger than 62 mm), and the vertex opening of reflector does not exceed 80 mm.

In preferred embodiments, a retrofit system also accounts for certain relationships when selecting a reflector. These relationships include: selecting a reflector and other components that physically fit into existing lamp housing; selecting the appropriate focal distance of the reflector to enable a concentrated light beam to hit a target of the selected aspect ratio of motion picture film; selecting reflectors that have working distances which may vary from 540 mm to 825 mm; accounting for the focal length of lens in the selection of the reflector diameter (in some embodiments, it is also recognized that short focal lenses below 55 mm and extra long focal lenses above 150 mm have ability to focus beyond the film plane); and, the arc of selected bulb must be positioned precisely at the F1 of the reflector for optimal effectiveness, the position varying from 40 mm to 95 mm depending on reflector selection. It is recognized that the requirements for precise positioning inevitably require maintenance and perhaps adjustment over time.

The selection of the bulb, reflector and retro-fit kit for the lamp house is determined by the size of the screen, the projection distance, the film format and the make of the projector. The selected focal length of the lens will also influence the choice of the components. In various embodiments, the process can deliver an increase in film resolution of up to 70%. This resolution is dependent on the selected bulb, the material (glass or metal) of the reflector and the coating on the reflector. Aspects of additional equipment or components used in retrofit of existing lamp houses are provided in FIGS. 7–23.

The process also includes mechanical modifications to projectors being improved by the system. For example, modifications on the pull-down movement of the film or the shutter are sometimes necessary in order to improve the overall F-number or speed at which the light will travel through the system. The final aspect of the process involves mechanically modified lens holders and custom-modified lenses. Aspects of modifications to projection equipment are provided in FIGS. 4, 9, 10 and 11.

A method for optimizing an illumination source for a film projector is provided comprising selecting a light source for installation in a lamp house of the film projector; selecting a reflector for use with the light source having a surface and shape for producing a concentrated beam of light; and orienting the light source and the reflector to produce the concentrated beam of light in a plane through which a film in the film projector travels. Orienting comprises placing the light source in conjunction with an ideal F1 of the reflector.

An illumination system for a film projector is provided comprising a light source for projecting images from a film; and a parabolic reflector oriented in relation to the light source and the film so as to concentrate light from the light source at a plane through which the film travels. The illumination system comprises infrared filters for reducing infrared light. The illumination system comprises components for retrofit of an existing lamp house of a film projector.

One of the features of the present invention is the ability to provide a kit for a retrofit of an existing conventional motion picture film projector with features of the present invention. The kit preferably comprises a reflector (glass or metal), an adapter for mounting the reflector to a mount in the frame of the lamp house, an adapter for the anode, mounting hardware for the reflector, and a smaller wattage lamp bulb (smaller than the wattage of the lamp bulb being replaced). Other optional components of the kit can include an IR filter, a new cooling fan, a 45 degree mirror, a smaller angle shutter, and a high speed intermittent.

With the present invention, because more light reaches the screen than in the past, a better picture can be seen on the screen. This is also done with a lower wattage lamp bulb. With the present invention, faster maintenance is provided because it takes less time to align the bulb to the reflector than in the past.

Figure 36:
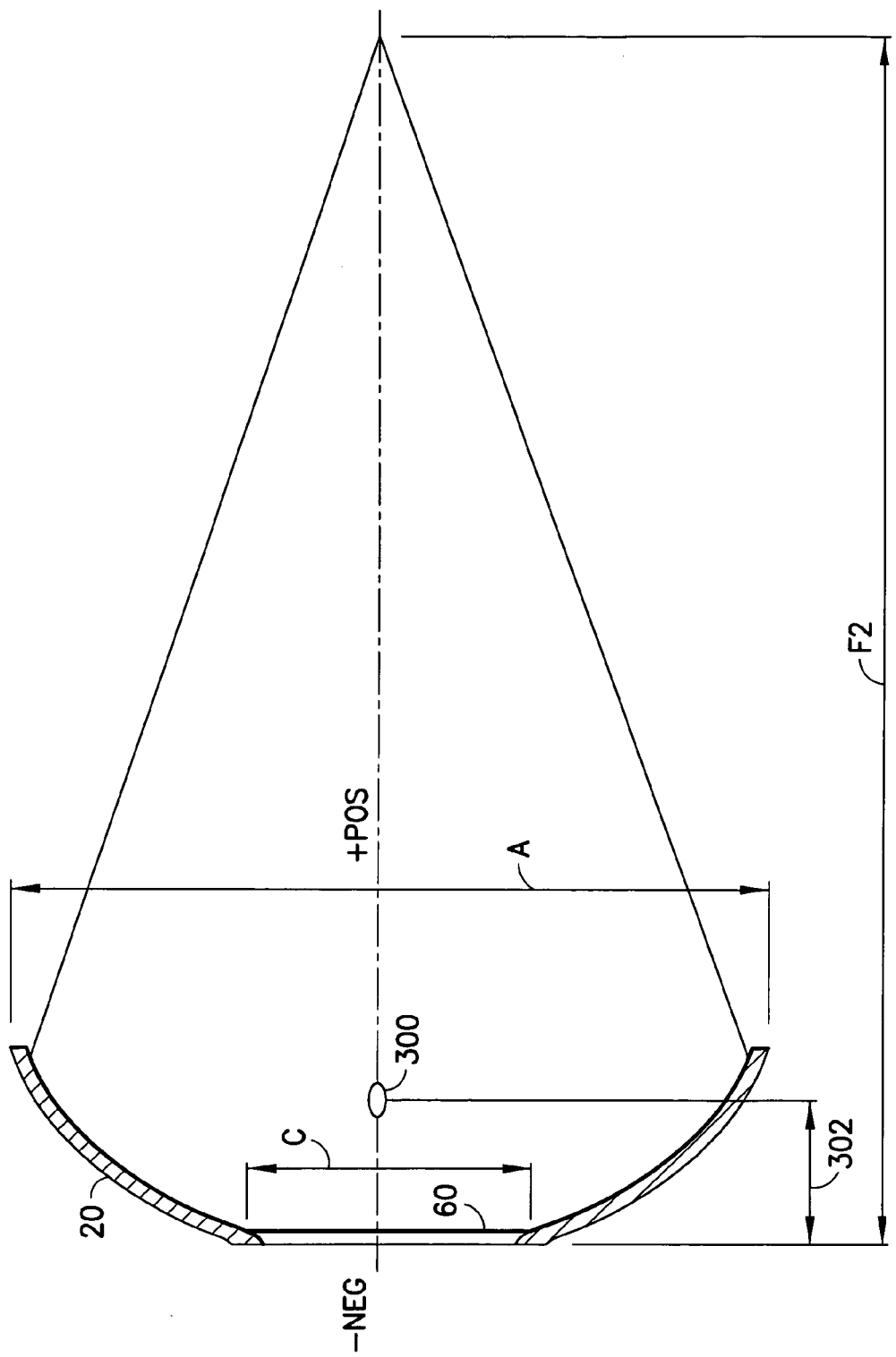
FIG. 36 is a diagram of the dimensions of the bulb and reflector placement and reflector focal distance.

Referring now to FIGS. 36 and 5, a diagram of one embodiment of the reflector 20 relative to the xenon arc 300 of the bulb is shown in FIG. 36. In this embodiment, the aperture 60 has a diameter C of 70 mm. The arc 300 is established between the electrodes 76, 78 (see FIG. 33 for example) of the bulb. The arc 300 is spaced a distance 302 from the rear of the reflector 20 of about 55 mm. F2 is about 825 mm. Diameter A of the reflector is about 280 mm.

The reflector is a concave ellipsoid. The radius of curvature of the osculating sphere at the vertex is Rc of about 101.6 mm (4 inches). The nominal eccentricity of the meridian section for stigmatic on-axis imaging is e of about 0.8760. The reflector forms an image of the source magnified by a factor of m which is about 15. Hence, a 2 mm diameter arc is imaged as a 30 mm diameter spot light. This light spot is able to fully illuminate a projector objective having an f-ratio of f/2.8.

Figure 37:
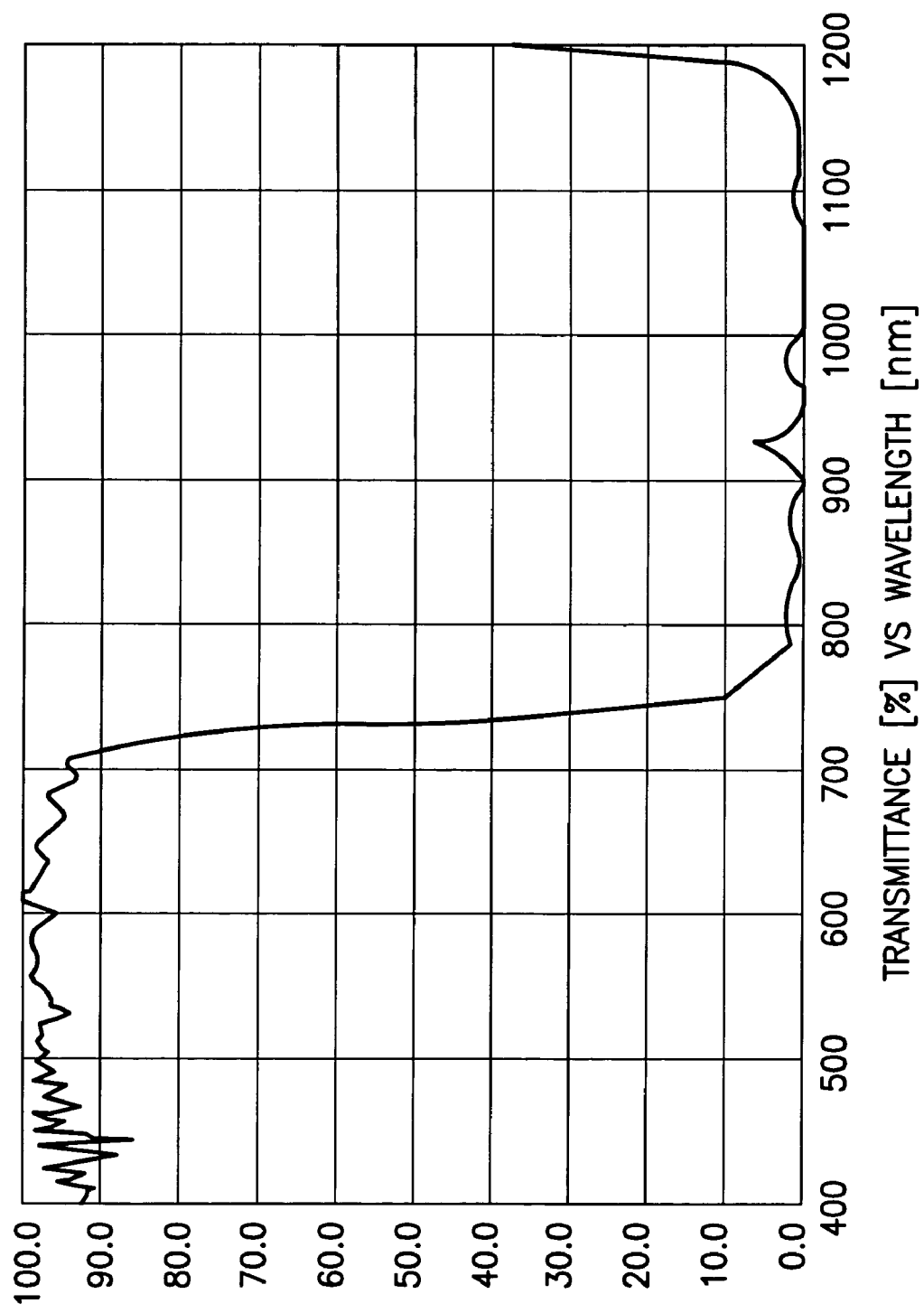
FIG. 37 is a chart showing percentage of transmittance versus wavelength for the IR filter.

Referring now to FIG. 37 a chart showing the transmittance in percent versus the wavelength in nanometers of the IR filter 28 is shown. The filter 28 is an ULTRACLEAR heat filter. The IR filter is a high efficiency hot mirror designed to allow visual light to pass while reflecting infrared. The filter was purchased from UltraFlat, 20306 Sherman Way Winnetka, Calif. 91306 USA. The ULTRACLEAR heat filter is much more efficient than other existing products. Recently this hot mirror was compared with Strong's existing standard using an incident light meter. When the new hot mirror was installed, the meter registered an increased of two camera stops. The heat level was less as well. The heat filters can be used in 16 mm and 35 mm projection applications for example. Because the objective is maximum light output, heat is always a problem. The present invention is able to address this problem by use one of these filters in applications where formerly two filters would have been required were required.

In projection, the filter provides more light, with much less heat on the gate. It is visually clear. The result is high visual transmission, high infrared reflection, excellent separation of visible and infrared radiation. Color neutral is provided at either 5500K or 3200K to +/− 150K. The filter is tough and easy to clean. Operating temperature of the filter is up to 600 degrees Centigrade. This heat filter shows no green cast in the visual spectrum. This factor is to the advantage of television production companies, which use this in spotlight requirements. In using the filter with Xenon Laboratories, it is recommended that the heat filters be installed at an angle to avoid "bouncing" the heat right onto the bulb.

One skilled in the art will recognize that the invention disclosed herein is not limited to the embodiments presented. For example, other lamp houses, reflectors, bulbs, lenses and/or other hardware may be used in this invention. Therefore, the teachings herein are considered to be illustrative only, and not limiting of the invention in any way. Various alternatives and modifications can be devised by those skilled in the art without departing from the invention. Accordingly, the present invention is intended to embrace all such alternatives, modifications and variances which fall within the scope of the appended claims.

What is claimed is:

1. A motion picture film projector comprising:
   a lamp house section comprising a lamp bulb and a reflector;
   a head section located in front of the lamp house section, the head section comprising a shutter, an aperture, and a film movement system; and
   an optical member located proximate a junction between the lamp house section and the head section, wherein the optical member comprises infrared filtering coatings on both a front side and a rear side of the optical member, and wherein the lamp bulb is aligned generally horizontally, wherein the reflector has a rear aperture with a portion of the lamp bulb extending therethrough, wherein the rear aperture is larger than a center outer diameter of the lamp bulb,
   wherein the lamp bulb and the reflector are sized and shaped such that an operator looking rearward from a front side of the lamp bulb and reflector, and looking generally coaxially relative to a center longitudinal axis of the lamp bulb, can see a general ring shaped gap between the reflector and the lamp bulb when the lamp bulb is aligned relative to the reflector.

2. A motion picture film projector comprising:
   a lamp house section comprising a lamp bulb and a reflector;
   a head section located in front of the lamp house section, the head section comprising a shutter, an aperture, and a film movement system; and
   an optical member located proximate a junction between the lamp house section and the head section, wherein the optical member comprises infrared filtering coatings on both a front side and a rear side of the optical member, and wherein the lamp bulb is aligned generally horizontally, wherein the reflector has a rear aperture with a portion of the lamp bulb extending therethrough, wherein the rear aperture is larger than a center outer diameter of the lamp bulb,
   wherein the lamp house further comprises a lamp bulb anode adaptor, attached to a lamp bulb anode of the lamp house, which is sized and shaped to space a rear end of the lamp bulb forward from the lamp bulb anode and thereby allow the lamp bulb to be located closer to a front end of the lamp house.

3. A motion picture film projector as in claim 2 wherein the lamp house further comprises a cantilevered front cathode lamp bulb holder which extends in a forward direction and is adapted to be deflected to align a front end of the lamp bulb.

4. A motion picture film projector as in claim 1 wherein the shutter comprises a shutter of less than about 75°.

5. A motion picture film projector as in claim 4 wherein the film movement system comprises a high speed intermittent.

6. A motion picture film projector comprising:
   a lamp house section comprising a lamp bulb and a reflector;
   a head section located in front of the lamp house section, the head section comprising a shutter, an aperture, and a film movement system; and
   an optical member located proximate a junction between the lamp house section and the head section, wherein the optical member comprises infrared filtering coatings on both a front side and a rear side of the optical member, and wherein the lamp bulb is aligned generally horizontally, wherein the reflector has a rear aperture with a portion of the lamp bulb extending therethrough, wherein the rear aperture is larger than a center outer diameter of the lamp bulb, wherein the head section comprises two lens collar at a front end of the head section, and wherein at least one of the lens collars is an eccentric collar which is adapted to be rotated to align a flat wide screen image on screen and correct for a vertically off-center aperture in the head section.

7. A motion picture film projector lamp house assembly comprising:

a lamp bulb aligned generally horizontally;

a reflector having a rear aperture with a portion of the lamp bulb extending therethrough, wherein the rear aperture is larger than a center outer diameter of the lamp bulb, wherein the lamp bulb and the reflector are sized and shaped such that an operator looking rearward from a front side of the lamp bulb and reflector, and looking generally coaxially relative to a center longitudinal axis of the lamp bulb, can see a general ring shaped gap between an innermost edge of an aperture through the reflector and the lamp bulb when the lamp bulb is aligned relative to the reflector.

8. A motion picture film projector lamp house assembly as in claim 7 further comprising an infrared filter at a front end of the lamp house having infrared coatings on both a front side and a rear side of the filter.

9. A motion picture film projector lamp house assembly as in claim 7 further comprises a lamp bulb anode adaptor, attached to a lamp bulb anode of the lamp house, which is sized and shaped to space a rear end of the lamp bulb forward from the lamp bulb anode and thereby allow the lamp bulb to be located closer to a front end of the lamp house.

10. A motion picture film projector lamp house assembly as in claim 7 further comprising a cantilevered front cathode lamp bulb holder which extends in a forward direction and is adapted to be deflected to align a front end of the lamp bulb.

11. A motion picture film projector retrofit kit comprising:

a reflector;

a reflector mounting system for mounting the reflector to a reflector holder of a lamp house for replacing an old reflector to be replaced;

a lamp bulb for replacing an old lamp bulb to be replaced; and a lamp bulb anode adaptor which is sized and shaped to be attached to a lamp bulb anode of the lamp house and adapted to allow a rear end of the lamp bulb to be mounted to the adaptor, wherein the adaptor is adapted to space the rear end of the lamp bulb forward from the lamp bulb anode and thereby allow the lamp bulb to be located closer to a front end of the lamp house than the old lamp bulb being replaced.

12. A motion picture film projector retrofit kit as in claim 11 wherein the reflector comprises a glass reflector for replacing a metal old reflector.

13. A motion picture film projector retrofit kit as in claim 11 further comprising an infrared filter having infrared filter coatings on both a front side and a rear side of the filter.

14. A motion picture film projector retrofit kit as in claim 11 further comprising a shutter comprising a shutter angle of less than about 75°.

15. A motion picture film projector retrofit kit as in claim 11 further comprising a high speed intermittent.

16. A motion picture film projector retrofit kit as in claim 11 further comprising a lamp house section cooling fan.

17. A method for aligning a lamp bulb with a reflector in a motion picture film projector comprising:

providing the reflector with a rear hole;

positioning the lamp bulb to pass through the rear hole of the reflector;

visually observing from a front end of the lamp bulb a general ring shaped gap between a center outer diameter of the lamp bulb located in front of the rear hole and an inner perimeter of the reflector at the rear hole; and adjustably moving a front end of the lamp bulb to make the gap substantially uniform and thereby align the lamp bulb with the reflector.

* * * * *